US008751309B2

(12) United States Patent
O'Hara

(10) Patent No.: US 8,751,309 B2
(45) Date of Patent: Jun. 10, 2014

(54) TARGETED COMMUNICATION BETWEEN PROMOTERS AND CONSUMERS

(75) Inventor: Michael A. O'Hara, Westwood, MA (US)

(73) Assignee: Tagzo World LLC, Westwood, MA (US)

( * ) Notice: Subject to any disclaimer, the term of this patent is extended or adjusted under 35 U.S.C. 154(b) by 89 days.

(21) Appl. No.: 13/346,360

(22) Filed: Jan. 9, 2012

(65) Prior Publication Data

US 2012/0278168 A1 Nov. 1, 2012

Related U.S. Application Data

(60) Provisional application No. 61/480,051, filed on Apr. 28, 2011.

(51) Int. Cl.
*G06Q 30/00* (2012.01)
*G06Q 30/02* (2012.01)
*G06F 17/30* (2006.01)
*H04L 29/08* (2006.01)
*H04M 3/42* (2006.01)

(52) U.S. Cl.
CPC ........ *G06Q 30/0271* (2013.01); *G06Q 30/0257* (2013.01); *G06Q 30/0281* (2013.01); *G06F 17/30283* (2013.01); *H04L 67/306* (2013.01); *H04M 3/42* (2013.01)
USPC ..................... 705/14.55; 705/14.25; 705/500; 705/35; 705/14.36; 705/7.27

(58) Field of Classification Search
None
See application file for complete search history.

(56) References Cited

U.S. PATENT DOCUMENTS

| 5,890,140 | A  | * | 3/1999  | Clark et al. ..................... 705/35 |
| 6,055,573 | A  | * | 4/2000  | Gardenswartz et al. ...... 709/224 |
| 6,298,330 | B1 | * | 10/2001 | Gardenswartz et al. ... 705/14.25 |
| 7,617,160 | B1 | * | 11/2009 | Grove et al. .................. 705/500 |
| 7,734,570 | B2 | * | 6/2010  | Bachman et al. ..................... 1/1 |
| 7,756,744 | B2 |   | 7/2010  | Schiff et al. |
| 7,895,078 | B2 |   | 2/2011  | Schiff et al. |
| 7,957,991 | B2 | * | 6/2011  | Mikurak ...................... 705/7.11 |
| 8,032,409 | B1 | * | 10/2011 | Mikurak .................... 705/14.39 |
| 2002/0004754 | A1 | * | 1/2002 | Gardenswartz et al. ........ 705/26 |

(Continued)

OTHER PUBLICATIONS

Tsuang, M. (2003). A marketing process-planning model for sinlau christian hospital, tainan, taiwan. (Order No. 3098713, University of South Carolina). ProQuest Dissertations and Theses,, 179-179 p.*

(Continued)

*Primary Examiner* — Gurkanwaljit Singh
(74) *Attorney, Agent, or Firm* — Wolf, Greenfield & Sacks, P.C.

(57) ABSTRACT

Techniques for distributing messages to consumers on behalf of promoters. In some embodiments, once a message is provided to a message distribution system to be distributed to consumers on behalf of promoters, the message distribution system may determine the consumers to which to distribute the message based on the personal interest identifiers for the consumers that identify personal interests of the consumers. In particular, in some embodiments, a message distribution system may determine a topic for a message and personal interest identifiers for the message that correspond to personal interest identifiers input by consumers. Once the set of personal interest identifiers for the message has been identified, a set of consumers who have input one or more of those personal interest identifiers is identified. The message may then be made available to the identified set of consumers.

25 Claims, 16 Drawing Sheets

(56) References Cited

U.S. PATENT DOCUMENTS

| | | | |
|---|---|---|---|
| 2002/0046105 A1* | 4/2002 | Gardenswartz et al. | 705/14 |
| 2002/0156688 A1 | 10/2002 | Horn et al. | |
| 2003/0023489 A1 | 1/2003 | McGuire et al. | |
| 2004/0102980 A1 | 5/2004 | Reed et al. | |
| 2005/0004837 A1 | 1/2005 | Sweeney et al. | |
| 2006/0074769 A1 | 4/2006 | Looney et al. | |
| 2006/0089914 A1* | 4/2006 | Shiel et al. | 705/52 |
| 2006/0178918 A1* | 8/2006 | Mikurak | 705/7 |
| 2007/0217557 A1 | 9/2007 | Schiff et al. | |
| 2008/0215426 A1 | 9/2008 | Guldimann et al. | |
| 2008/0222127 A1* | 9/2008 | Bergin | 707/5 |
| 2009/0164293 A1* | 6/2009 | Coley | 705/9 |
| 2010/0191598 A1* | 7/2010 | Toennis et al. | 705/14.36 |
| 2011/0196743 A1 | 8/2011 | Schiff et al. | |
| 2012/0011068 A1* | 1/2012 | Dearing et al. | 705/50 |
| 2012/0016733 A1* | 1/2012 | Belvin et al. | 705/14.41 |

OTHER PUBLICATIONS

Business Editors, &. T. W. (Nov. 2, 1998). Proactive networks offers TelAlert-pronto watch 2.5 integration. Business Wire.*

Holland, J. L. (1996). Ethnic consumer reaction to targeted marketing: A theory of intercultural accommodation. (Order No. 9703780, The University of Nebraska—Lincoln). ProQuest Dissertations and Theses,, 164-164 p.*

Gibson, S. (2012). Direct-to-consumer advertising in the digital age: The impact of the internet and social media in the promotion of prescription drugs in canada. (Order No. MR85194, University of Toronto (Canada)). ProQuest Dissertations and Theses,, 84.*

VanHurley, V. L. (2007). The influence of packaging color on consumer purchase intent: The influence of color at the point of purchase. (Order No. 3282211, Michigan State University). ProQuest Dissertations and Theses,, 164.*

Bottomly, G. D. (2004). The relationship between technology and consumer behavior and the impacts on business strategy for multinational firms in the memory preservation industry. (Order No. 3138851, Walden University). ProQuest Dissertations and Theses,, 476-476 p.*

Jaronski, W. (2004). Customer satisfaction and loyalty research: A bayesian network approach. (Order No. 3141567, Limburgs Universitair Centrum (Belgium)). ProQuest Dissertations and Theses,, 360-360 p.*

International Search Report and Written Opinion from International Application No. PCT/US2012/020652, dated May 8, 2012.

Adlibrium Web Site Literature retrieved from <http://www.adlibrium.com/> on Mar. 2, 2012, pp. 1-3.

Google Web Site Literature, entitled "Google Offers Brings the Right Customers to Your Door," retrieved from <http://www.google.com/offers> date not available, p. 1.

Google Web Site Literature, entitled "How Google Offers Works," retrieved from <http://www.google.com/offers/home > date not available, p. 1.

Google Web Site Literature, entitled "$15 for $40 toward Asian fusion cuisine at OM Restaurant | Lounge," retrieved from <http://www.google.com/offers/home> on Jan. 27, 2012, pp. 1-2,.

Google Web Site Literature, entitled "Offer Settings," retrieved from <http://www.google.com/offers/home> on Jan. 27, 2012, p. 1.

Google Web Site Literature, entitled "What types of offers should we send you?", retrieved from <http://www.google.com/offers/home> on Jan. 27, 2012, pp. 1-2.

Admine Web Site Literature, entitled "Frequently asked questions," retrieved from <http://www.admine.com/faq.aspx> on Mar. 2, 2012, pp. 1-12.

Admine Web Site Literature, entitled "About how admine works," retrieved from <http://www.admine.com/howitworks.aspx> on Jan. 27, 2012, p. 1.

Admine Web Site Literature, entitled "Reach Your Receptive, Exclusive Audience," retrieved from <http://www.admine com/a/start.aspx> on Jan. 27, 2012, p. 1.

Admine Web Site Literature, entitled "Interests," retrieved from <http://www.admine.com/interests.aspx?signup=1> on Jan. 27, 2012, p. 1.

Admine Web Site Literature, entitled "Refine," retrieved from <http://www.admine.com/Refine.aspx?signup=1> on Jan. 27, 2012, p. 1.

Personal Web Site Literature, entitled "Getting Started," retrieved from <http://www.personal.com/how-it-works/getting-started> on Mar. 2, 2012, pp. 1-2.

Personal Web Site Literature, entitled "Personal Is," retrieved from <http://www.personal.com/how-it-works/personal-is> on Mar. 2, 2012, pp. 1-3.

The New York Times Web Site Literature, Brustein, J. "Start-Ups Seek to Help Users Put a Price on Their Personal Data," retrieved from <http://www.nytimes.com/2012/02/13/technology/start-ups-aim-to-help-users-put-a-price-on-their-personal-data.html?emc=etal> on Mar. 2, 2012, pp. 1-3.

Groupon Web Site Literature, entitled "About Us," retrieved from <http://www.groupon.com/about> on Jan. 27, 2012, pp. 1-5.

Groupon Web Site Literature, entitled "Learn About Groupon," retrieved from <http://www.groupon.com/learn> on Jan. 27, 2012, pp. 1-14.

Groupon Web Site Literature entitled "My Profile," retrieved from <http://www.groupon.com/users/user13926/profile/edit> on Jan. 27, 2012, pp. 1-5.

Google Web Site Literature, entitled "Google Alerts—Monitor the Web for interesting new content," retrieved from <http://www.google.com/alerts> on Jan. 27, 2012, p. 1.

Google Web Site Literature, entitled "What are Google Alerts?—Alerts Help," retrieved from <http://www.google.com/alerts/bin/answer.py?hl=en&topic=28415&answer=175925&parent=28413&rd=2> on Jan. 27, 2012, p. 1.

Microsoft AdChoice Web Site Literature, entitled "Personalized Advertising from Microsoft," retrieved from <http://choice.live.com/advertisementchoice/> on Jan. 27, 2012, p. 1.

Dotomi Web Site Literature, entitled "Privacy Policy—Rethink display advertising with Personalized Media by Dotomi," retrieved from <http://www.dotomi.com/privacy.html> on Jan. 27, 2012, pp. 1-3.

Dotomi Web Site Literature, entitled "About Us—Rethink display advertising with Personalized Media by Dotomi," retrieved from <http://www.dotomi.com/about-us/> on Jan. 27, 2012, p. 1.

Google Web Site Literature, entitled "Ads Preferences Manager," retrieved from <http://www.google.com/settings/ads/onweb/?sig=ACi0TCjdvRqlFfzVx0hsg2jpjzPUa6Ow . . . > on Jan. 27, 2012, p. 1.

Facebook Like Button Web Site Literature, entitled "Like Button—Facebook Developers," retrieved from <http://www.developers.facebook.com/docs/reference/plugins/like/> on Feb. 24, 2012, pp. 1-3.

Adlibrium Web Site Literature, entitled "Dailies from Adlibrium—Dailies," retrieved from <http://www.dailies.adlibrium.com/> on Feb. 14, 2012, p. 1.

Facebook Web Site Literature, entitled "Adlibrium—Info | Facebook," retrieved from <http://www.facebook.com/GoAdlibrium?sk=info> on Feb. 14, 2012, pp. 1-2.

Jasmere Web Site Literature, entitled "GreaterGood Deals| That Give," retrieved from <http://www.jasmere.com> on Feb. 14, 2012, pp. 1-2.

Jasmere Web Site Literature, entitled "How GreaterGood work | jasmere," retrieved from <http://www.greatergooddeals.com/content/how-greatergood-deals-work> on Feb. 14, 2012, p. 1.

Gilt Groupe Web Site Literature, entitled "About Gilt Groupe," retrieved from <http://www.gilt.com/company/about> on Feb. 14, 2012, p. 1.

Gilt Groupe Web Site Literature, entitled "My Account," retrieved from <http://www.gilt.com/account/update> on Feb. 14, 2012, pp. 1-3.

Facebook Web Site Literature, entitled "Targeting Options—Facebook Help Center," retrieved from <http://www.facebook.com/help/?page=203882222982239> on Feb. 14, 2012, pp. 1-2.

ChoiceStream Web Site Literature retrieved from <http://www.choicestream.com/> on Feb. 14, 2012, p. 1.

(56) References Cited

OTHER PUBLICATIONS

ChoiceStream Web Site Literature, entitled "ChoiceStream :: What is Connect," retrieved from <http://www.choicestream.com/what/personalized.php> on Feb. 14, 2012, pp. 1-2.

ChoiceStream Web Site Literature, entitled "ChoiceStream :: Why Connect Works," retrieved from <http://www.choicestream.com/what/connect-why,php> on Feb. 14, 2012, pp. 1-2.

ChoiceStream Web Site Literature, entitled "ChoiceStream :: Connect: Tech," retrieved from <http://www.choicestream.com/what/connect-how.php> on Feb. 14, 2012, pp, 1-2.

ChoiceStream Web Site Literature, entitled "ChoiceStream :: Connect: Tech," retrieved from <http://www.choicestream.com/what/connect-tech.php> on Feb. 14, 2012, pp. 1-2.

Yahoo! Smart Ads Web Site Literature, entitled "Smart Ads—Yahoo!", retrieved from <http://advertising.yahoo.com/article/smart-ads.html > on Feb. 14, 2012, pp. 1-2.

Google Web Site Literature, entitled "Google AdWorks—Online Advertising by Google," retrieved from <http://accounts.google.com/ServiceLogin?service=adworks&hl=en_US<mpl_jkcon&p . . . > on Feb. 14, 2012, p. 1.

Yahoo! Web Site Literature, entitled "Ad Interest Manager," retrieved from <http://info.yahoo,com/privacy/us/opt_out/targeting/> on Feb. 14, 2012, p. 1.

Trulia Web Site Literature, entitled "Trulia—Real Estate, Homes for Sale, Sold Properties, Apartments for Rent," retrieved from <http://www.trulia.com> on Feb. 14, 2012, pp. 1-2.

Trulia Web Site Literature, entitled "Trulia Real Estate Search—Advanced Search," retrieved from <http://www.trulia.com/advanced> on Feb. 14, 2012, pp. 1-2.

Realtor.com Web Site Literature, entitled "Find Real Estate, Homes for Sale & Houses for Rent on Realtor.com —Realtor.com® ," retrieved from <http://www.realtor.com> on Feb. 14, 2012, p. 1.

Realtor.com Web Site Literature, entitled "Realtor.com® 's Search Assist Connects Buyers and Realtor.com® to Refine Home Searches," retrieved from <http://www.realtor.com/blogs/2009/11/05/realtor-com%C2%AEs-search-assist-connects-buyers-and-realtors%C2%AE-to-refine-home-searches/> on Feb. 14, 2012, pp. 1-3.

International Preliminary Report on Patentability and Written Opinion from International Application No. PCT/US2012/020652, dated Oct. 29, 2013.

* cited by examiner

FIG. 15

1502: Message ID  Promoter  Category  Subject  Message  Criteria  Calendar  Age-Restricted  Cost  Identifiers  Schedule Option  Total Views  Total Thumbs Up  Total Thumbs Down  Total Calendar Adds  Total Archives  Total Deletions 1504: Message ID  Consumer ID  New Message  Calendarized  Archived  Deleted  Thumbs Up  Thumbs Down  Notification Sent 1506: Message ID  Consumer ID  Time Viewed

TARGETED COMMUNICATION BETWEEN PROMOTERS AND CONSUMERS

RELATED APPLICATIONS

This application claims priority under 35 U.S.C. §119(e) to U.S. Provisional Application No. 61/480,051, titled "Targeted communication between promoters and consumers," filed Apr. 28, 2011, which is herein incorporated by reference in its entirety.

BACKGROUND

Businesses and organizations provide information about their products and services via the Internet to make the information available to potential customers and members. One way that businesses and organizations provide information via the Internet is through advertising. Some web pages contain display advertising that includes static or animated images, audio and/or video components. The display advertisements may be displayed together with other content of the web page, which could be news content, sports content, entertainment content, etc.

Businesses and organizations attempt to direct their advertisements to viewers of the advertisements who might be interested in the content of the advertisements (i.e., interested in the products or services of a business or organization) so as to increase the likelihood that a person viewing the advertisement will become a customer or member of the business or organization. To direct advertisements to viewers who might be interested in the advertisement content, the business or organization first guesses at what type of people might be interested in the advertisement content, then guesses at which people might match the identified type, and then guesses at the best way to reach those people. The guesses made by the business or organization may be educated guesses based on information collected about actual or potential customers or members, such as by surveying or monitoring actual or potential customers and analyzing the results of the surveying/monitoring.

In particular, to identify the type of people who might be interested in the advertising content, the business or organization guesses at demographic characteristics of people who might be interested, such as characteristics related to age, gender, hobbies, geographic location, etc. To identify what people might match the identified type of people and the best way to reach them, the business organization guesses at particular web pages that the type of people might frequent and advertises via those web pages, trusting that some of the viewers of the web pages might be interested in the advertising content. Alternatively, after identifying the demographic characteristics, the business or organization may rely on behavioral tracking of people as they use the Internet to determine whether a particular person's activity indicates that he/she is one of the type of people identified as possibly interested in the advertising content.

Behavioral tracking can identify personal information about an individual, such as the individual's age, gender, geographic location, websites previously visited, or previous purchases. Such personal information can be obtained by tracking the individual's online activities, including web searches that the individual conducted, the web pages visited by the individual, and the content viewed by the individual. Several technologies have been developed that enable tracking an individual's behavior online, including loading small identifying pieces of code into the individual's browser, inspecting packets communicated by the individual's computer, or by accessing membership information from third-party sites.

SUMMARY

In one embodiment, there is provided a method of operating a system that distributes, on behalf of one or more promoters, messages based on personal interests of one or more consumers to whom the messages are to be distributed. The system comprises at least one server having a user interface by which consumers receive the messages. The method comprises receiving, at the system, a request from a consumer to receive, via the system from promoters, messages relating to a personal interest of the consumer. The request comprises a personal interest identifier indicating the personal interest of the consumer. The method further comprises storing, in at least one data store of the system, information associating the personal interest identifier with the consumer regardless of whether the personal interest identifier was previously stored in the at least one data store.

In another embodiment, there is provided a method of operating a system that distributes, on behalf of one or more promoters, messages via the system to one or more consumers associated with one or more personal interest identifiers. Each personal interest identifier indicates a personal interest of a consumer and indicates a request by a consumer to receive, via the system from the one or more promoters, messages relating to the personal interest. The method comprises, for a message of a promoter that is to be distributed via the system to one or more consumers, identifying, based on at least one characteristic of the message and a set of one or more personal interest identifiers stored in at least one data store of the system and associated with one or more consumers, a set of personal interest identifiers for the message, the set of personal interest identifiers comprising one or more personal interest identifiers, and identifying, based on information in the at least one data store associating the one or more consumers and the set of one or more personal interest identifiers, at least one consumer to whom to distribute the message based at least in part on the set of personal interest identifiers. The method further comprises making the message available to the at least one consumer via at least one server of the system having a user interface by which consumers can receive the message.

In a further embodiment, there is provided a method of operating a system that distributes, on behalf of one or more promoters, messages via the system to one or more consumers associated with one or more personal interest identifiers. Each personal interest identifier indicates a personal interest of a consumer and indicates a request by a consumer to receive, via the system from the one or more promoters, messages relating to the personal interest. The method comprises receiving a request to view information regarding a set of personal interest identifiers stored by the system. The set of personal interest identifiers comprises one or more personal interest identifiers. The method further comprises querying at least one data store of the system to determine the information regarding the set of personal interest identifiers, wherein the querying to determine the information comprises determining a number of consumers who have provided a personal interest identifier of the set as part of a request to receive via the system messages relating to a personal interest corresponding to the personal interest identifier. The method further comprises providing a response to the request that includes the information.

Other embodiments provide at least one computer-readable storage medium having encoded thereon computer-executable instructions that, when executed by at least one computer, cause the at least one computer to carry out any of the foregoing methods.

Further embodiments provide an apparatus comprising at least one processor and at least one computer-readable storage medium having encoded thereon processor-executable instructions that, when executed by the at least one processor, cause the at least one processor to carry out any of the foregoing methods.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 15 is a block diagram of an exemplary format of storing information regarding messages;

DETAILED DESCRIPTION

Figure 1:
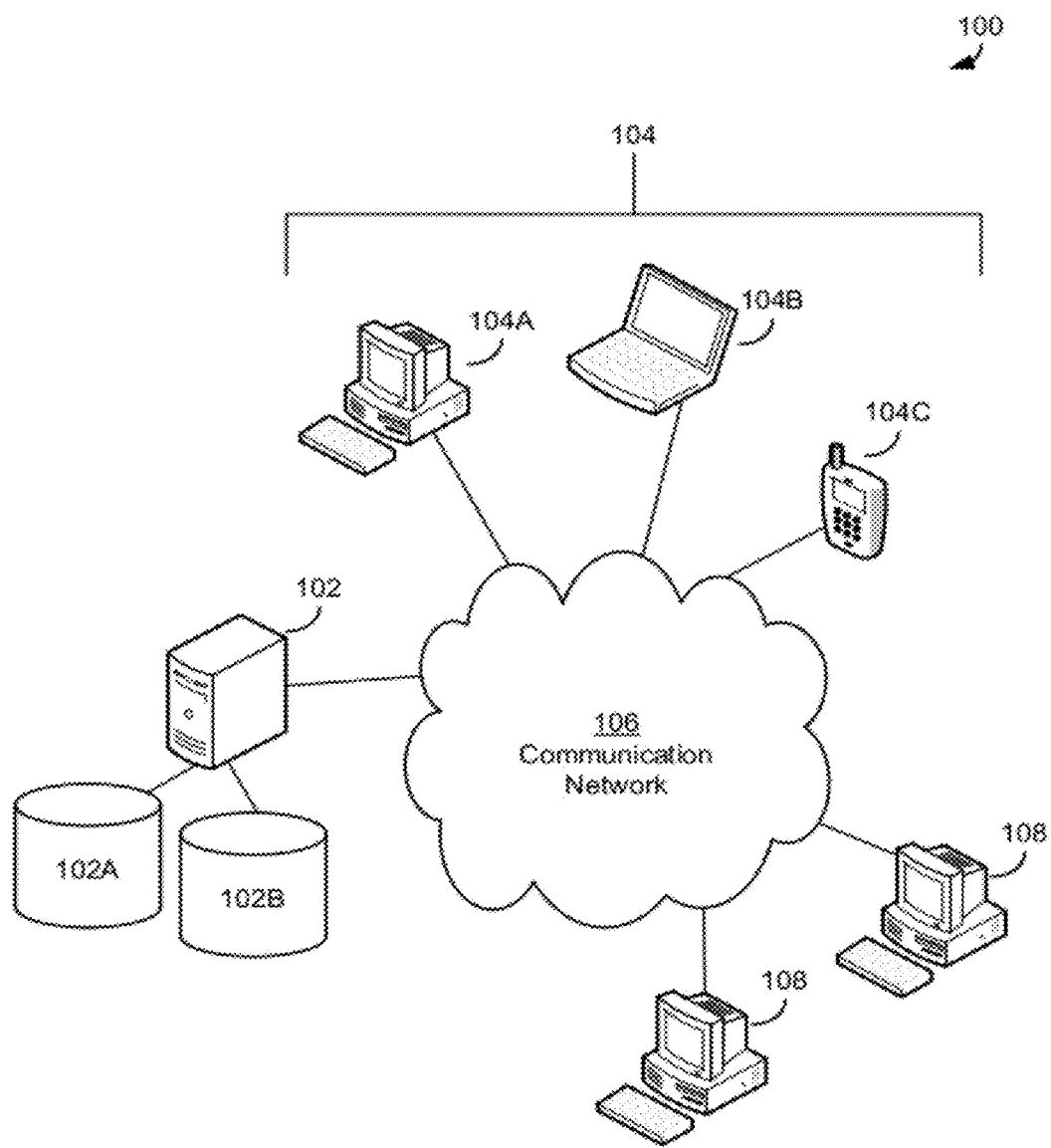
FIG. 1 is a sketch of an exemplary computing system in which some embodiments may operate.

Traditional forms of information delivery, such as advertising, focus on disseminating the information to as large a group of people as possible that might be interested in the information, in the hope that some of that group truly are interested in the information. These traditional information delivery techniques have focused on increasing the size of the group of potentially-interested people, such as by placing the advertisements on web pages believed to be frequented by people who might be interested in the information or by tracking people to determine, based on behaviors, whether certain individuals might be the type of people a business or organization believes might be interested in the information.

Applicant has recognized and appreciated, however, that information can be provided to a potentially-larger number of consumers who truly are interested in the information when the information is distributed to consumers who have expressly requested to receive information related to a topic of the message.

More particularly, Applicant has recognized and appreciated that the distribution to consumers of a message related to a topic would be improved by distributing the message, via a system, to those consumers who have expressly requested to receive via the system information related to that topic.

Traditional information delivery techniques rely on multiple different guesses, including guesses regarding the types of people who might be interested in the information and the best way to provide the people with that information. Applicant has recognized and appreciated that, as a result of such guesses, when information is provided to a group of people using these traditional techniques, only a fraction (and potentially a very small fraction) of the people truly are interested in the information. The provision of the information to the other people is, in effect, a waste of resources.

Applicant has recognized and appreciated the advantages of a system that transmits messages between promoters and consumers, such that consumers use the system to receive messages from promoters. Such a system could enable consumers to specify to the system their personal interests so as to request to receive, via the system, messages that relate to their personal interests. When a message is to be distributed through the system on behalf of a promoter to one or more consumers, the consumers to which the message is distributed could be determined based on the personal interests of the consumers. In particular, a topic of the message can be determined and compared to personal interests of consumers. When a consumer has indicated a personal interest that corresponds to the topic of the message, the message can be distributed to the consumer via the system. The consumers may then receive the messages via a user interface of the system.

Applicant has also recognized and appreciated the advantages of permitting consumers to specify personal interests without limiting the consumers to merely selecting pre-defined personal interests with which a system is configured. When consumers are permitted to input personal interests in an unbounded way, the consumers may specify a greater number of personal interests, be more comprehensive in specifying personal interests, or specify personal interests that may be important to a consumer but that might not have been predefined in a system. When consumers specify more personal interests or are more comprehensive in specifying personal interests, and messages are distributed based on these personal interests, promoters may benefit by being able to distribute messages to consumers that are truly interested in a topic to which a message corresponds. In this way, resources of the promoter that are used in distributing messages to consumers may be used most efficiently, by directing the resources only to distributing messages to the consumers that have indicated an interest in the content of the message.

Applicant has further recognized and appreciated that a system that distributes messages to consumers who have indicated an interest in receiving the content of the messages could provide improved privacy for the consumers to whom the messages are to be distributed. As mentioned above, previous techniques for delivering information collected information about people by monitoring those people, sometimes performing such monitoring without the knowledge or consent of those people. There are privacy concerns inherent in the collection of information about people, such as in protecting the information from misuse or theft. Even in previous techniques that did not surreptitiously obtain information about people, a great deal of personal information could be obtained directly from a person to determine whether the person fit into demographic categories that made the person likely to be interested in information to be delivered. Such personal information is always at risk and has to be protected in the same way that information obtained by surreptitious monitoring was at risk. A system that distributes messages to consumers who have expressly indicated an interest in receiving messages related to a topic, however, does not require personal information about a consumer and may, in some cases, not collect any personal information for the consumer or only optionally collect personal information for the consumer.

In view of the foregoing, described herein are techniques for operating a message distribution system that distributes messages to consumers on behalf of promoters based on personal interest of the consumers that the consumers provide to the system. The consumers to whom the messages are distributed and the promoters on behalf of whom the messages are sent may be any suitable entity or entities capable of entering into commercial or non-commercial transactions. An entity may be a person (including a human person) or an organization. Examples of consumers are discussed in detail below.

More particularly, described herein are techniques for receiving personal interest identifiers for one or more consumers. In some embodiments, the message distribution system may distribute messages to consumers based on personal interest identifiers that identify a personal interest of a consumer. The system may receive from a consumer a request to receive messages relating to a personal interest of the consumer by receiving from the consumer a personal interest identifier indicates the personal interest. A personal interest identifier that is received from the consumer may be stored by the system regardless of whether the personal interest identifier was previously stored by the system. In this way, the consumer may be enabled to input personal interest identifiers in an unbounded way in that the consumer may be enabled to provide an identifier for any personal interest, rather than only identifiers for specific personal interests that have been predefined by the system. The personal interest identifiers may be formatted in any suitable manner, including as text. In some embodiments, a system may be adapted to receive and store any text that may include alphabetic, numeric, and/or punctuation symbols as a personal interest identifier, while other embodiments may impose some limits on the type of text that may be included in a personal interest identifier.

Also described herein are techniques for distributing messages to consumers on behalf of promoters. In some embodiments, once a message is provided to a message distribution system to be distributed to consumers on behalf of promoters, the message distribution system may determine the consumers to which to distribute the message based on the personal interest identifiers for the consumers that identify personal interests of the consumers. In particular, in some embodiments, a message distribution system may determine a topic for a message and personal interest identifiers for the message that correspond to personal interest identifiers input by consumers. Once the set of personal interest identifiers for the message has been identified, a set of consumers who have input one or more of those personal interest identifiers is identified. The message may then be made available to the identified set of consumers.

Described herein are also techniques for aggregating information about consumers based at least in part on personal interest identifiers that the consumers have provided to the system. In some embodiments, the system may receive a request to view information regarding a set of one or more personal interest identifiers stored by the system and may query a data store of the system in response to the query. The querying may determine a number of consumers who have provided a personal interest identifier to the system. The system may then respond to the request with information including the number of consumers who have provided the personal interest identifier to the system.

Various examples of ways in which the techniques described herein are described in detail below. It should be appreciated that each of these examples are merely illustrative of the ways in which message distribution systems may operate and that embodiments are not limited to being implemented according to any of these examples. Further, while some embodiments may be described as implementing some of the techniques described herein, it should be appreciated that embodiments may implement one, some, or all of the techniques described herein in any suitable combination.

Further, it should be appreciated that message distribution systems are not limited to operating with any particular type or types of consumers, promoters, or messages and are not limited to operating with any examples of such given below. As mentioned above, in embodiments, consumers and promoters may be any suitable entities capable of entering into commercial or non-commercial transactions. An entity can be a person (including a human person) or an organization. Where an entity is an organization, an entity could be any suitable commercial or non-commercial business, company, advertiser, news service, event organizer, or any organization having any commercial or non-commercial purpose. In some cases, therefore, a consumer may be a human and a promoter may be a commercial business. Messages that may be distributed on behalf of a promoter to a consumer may include any suitable information about commercial or non-commercial transactions that a promoter and consumer may enter into. In some cases, messages may contain information regarding a business' products and/or services, or about the products and/or services of another business, such that a human consumer can learn about the products and/or services and engage in a commercial transaction regarding the products and/or services. In one such example, a promoter may distribute messages to advertise its own products and/or services to the human consumer, while in another example a promoter may be an advertising agency distributing messages to advertise to the human consumer the products and/or services of a business that is a client of the advertising agency. Embodiments are not limited to operating with messages having commercial content. Accordingly, in another example, a message may be information on a topic in which a promoter is interested, such as a social or political message, and may be distributed by the promoter through the message distribution system so as to reach one or more consumers who have indicated an interest in the topic. In particular, in some cases a message may be a blog or microblog post distributed by a human promoter to human consumers who have indicated an interest in the topic of the blog or microblog post.

In some cases herein, acts are described as being performed by a "consumer" or performed by a "promoter." In the case where the consumer/promoter is a non-human entity, such as a business entity or a non-commercial entity, a consumer or promoter may take an action when a human associated with the consumer/promoter takes the action. For example, when a promoter is described as providing a message to a message distribution system, the message may be provided by a human that is an employee of or member of an entity that is the promoter.

FIG. 1 illustrates an example of a computer system 100 in which some embodiments of a message distribution system may operate. It should be appreciated, though, that embodiments are not limited to operating in environments like the example of FIG. 1.

The computer system 100 includes a server 102 that may operate as a message distribution system. The server 102 may include one or more facilities to carry out the operations of a message distribution system operating according to techniques described herein, including an identifier facility for receiving and managing personal interest identifiers, a message facility for receiving, processing, and distributing messages, and a query facility for handling queries of information stored by the message distribution system. The server 102 may also have access to and may manage data stores 102A, 102B. Data store 102A may store personal interest identifiers and information about one or more consumers registered with the messages distribution system, including information associating consumers with personal interest identifiers input by the consumers. Data store 102B may store information regarding messages to be distributed by the system, including information regarding topics of messages and personal interest identifiers identified for a message. Data stores 102A, 102B may be implemented in any suitable manner, including as databases.

The server 102 may operate to receive information from consumers and distribute information to consumers via computing devices 104 operated by consumers. Three exemplary computing devices 104A, 104B, 104C are illustrated in FIG. 1, which are, respectively, a desktop personal computer, a laptop personal computer, and a mobile phone. Embodiments are not limited to operating with any particular type or types of computing devices for consumers but instead may send information to and/or receive information from consumers via any suitable computing device.

The server 102 may receive information, including personal interest identifiers, from consumers via computing devices 104 through a user interface that may be presented to a consumer on a computing device 104. The server 102 may also distribute information to consumers via a user interface that may be presented to a consumer on a computing device 104. For example, a user interface may be implemented as one or more web pages that are stored by the server 102 and distributed to the computing devices 104 for display to consumers. The consumers may interact with the web page to input personal interest identifiers and/or other information and may interact with the web page to receive and view messages distributed by the message distribution system on behalf of promoters.

Also illustrated in FIG. 1 are computing devices 108 that may be operated by promoters to interact with the server 102 and the message distribution system. A promoter may operate the computing device 108 to transmit to the server 102 information regarding messages and to receive information from the server 102 information regarding consumers to whom the messages may be or were distributed. In some embodiments, the promoters may interact with the server 102 and view information provided by the server 102 via a user interface that is presented on the computing devices 108. As above, in some embodiments the user interface may be implemented as one or more web pages stored by the server 102 and distributed to the computing devices 108.

As illustrated in FIG. 1, the server 102 may be connected to the computing devices 104, 108 and may communicate with the computing devices 104, 108 via a communication network 106. The communication network 106 may be any suitable one or more computer networks, including local area networks and/or wide area networks, and may include any suitable wired and/or wireless communication media. In some embodiments, the communication network 106 may include the Internet.

Figure 2:
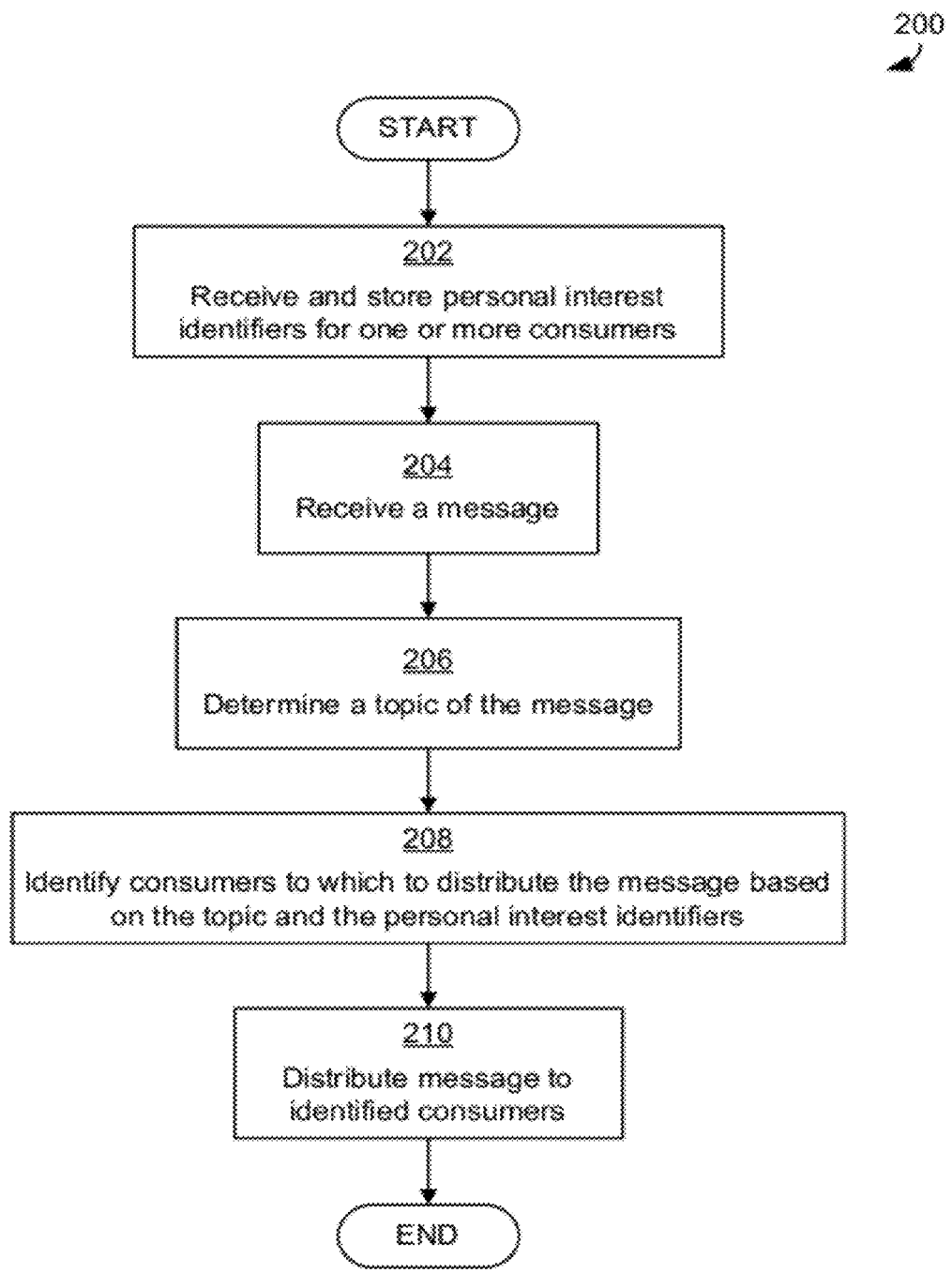
FIG. 2 is a flowchart of an exemplary process for distributing a message according to one or more topics of a message and one or more personal interest identifiers for one or more consumers.

FIG. 2 illustrates one exemplary technique for operating a message distribution system that may be implemented by some embodiments. Prior to the start of the process 200, the components of a message distribution system, such as one or more servers and one or more data stores, may be established. In some cases, some personal interest identifiers may have been loaded into the message distribution system by an administrator to make some personal interest identifiers available for selection by consumers, some consumers may have registered with the system and provided personal interest identifiers indicating personal interests of the consumers. Additionally, messages may have been distributed by the system to consumers. The process 200 of FIG. 2 may be carried out during operation of a message distribution system to interact with consumers and distribute messages to consumers on behalf of promoters.

The process 200 of FIG. 2 begins in block 202, in which an identifier facility of the message distribution system receives one or more personal interests identifiers input by one or more consumers. The personal interest identifiers may be input by the consumers in block 202 in any suitable manner, examples of which are discussed in greater detail below in connection with FIGS. 3-5. For example, a consumer may input the text of a personal interest identifier to the system via a user interface or may input a personal interest identifier by selecting the identifier from a list provided by the system via a user interface.

The personal interest identifiers input by the consumer(s) may be textual identifiers for any suitable personal interest. Personal interests of a consumer may include commercial interests, such as particular products the consumer is interested in purchasing or brands the consumer is interested in purchasing from, or non-commercial interests, such as particular hobbies of the consumer or other activities in which the consumer engages or wishes to engage. Generally, a personal interest identifier provided to the system by the consumer is a request by the consumer to receive information related to a topic identified by the personal interest identifier. Examples of personal interest identifiers include a residence of a consumer (e.g., "Boston"), a favorite sports team of a consumer (e.g., "Red Sox"), a type of cuisine a consumer enjoys (e.g., "Thai"), a type of information the consumer enjoys reading (e.g., "political news" or "sport news" or "fiction"), a type of product a consumer is interested in buying (e.g., "SUVs" or "jeans"), commercial brands a consumer enjoys or names of businesses that the consumer is interested in or would like to shop at (e.g., "The Gap"), or types of activities a consumer enjoys (e.g., "hiking" or "charitable fundraisers").

In some embodiments, a consumer may be enabled to provide any text to the system and is thus unbounded in being able to identify personal interests to the system, rather than merely being able to select from among personal interests and personal interest identifiers preselected by the system. In some embodiments, a system may impose some restrictions on the content of text that may be provided, such as by limiting personal interest identifiers to be alphabetic, numeric, or alphanumeric, though other embodiments may not impose any restrictions on the content of text.

Regardless of how the personal interest identifiers are input by consumers, once received the identifier facility stores the personal interest identifiers along with an indication of the consumer from which the personal interest identifiers were received. By storing the personal interest identifiers along with the indication of the consumer, the system is aware that the indicated consumer has requested to receive messages related to the personal interest identified by the personal interest identifier.

In block 204, a message facility of the message distribution system receives a message for distribution to one or more consumers via the system on behalf of a promoter. The message may include any suitable content formatted in any suitable manner, as embodiments are not limited in this respect. In some embodiments, messages may be displayed to consumers via a web page interface and in such embodiments a message may contain any suitable content organized in a Hypertext Markup Language (HTML) format. Messages may include any suitable one or more of text, images, audio, and video, or information in any other suitable format.

In block 206, once the message is received in block 204, the message facility of the system determines one or more topics of the message. The message facility may determine the topic in any suitable manner, as embodiments are not limited in this respect. In some cases, the message facility may carry out an automated process to evaluate the message and determine, from the message, one or more topics of the message. Where an automated process is used, any suitable automated process, including known processes for analyzing the syntax or semantics of a message, may be used. In other embodiments, the topic of a message may be identified by a human reviewing the message and identifying the topic. To determine a topic of a message from the message, characteristics of a message, which may include or be determined from any suitable portion of the message or data about the message, may be evaluated. For example, a promoter that is sending the message to the consumers may be evaluated to determine a topic of the message or a time that the promoter is sending the message may be identified. In other cases, content of the message such as the words or images used in the message or meanings conveyed by the message may be evaluated to determine the topic. For example, if the words "Boston Thai restaurants" are used in a message, potential topics of the message include "Boston" and "Thai."

The topics that a message facility can identify for a message may be or correspond to personal interest identifiers that have been input by consumers or correspond to personal interest identifiers that have been input by consumers. For example, in some embodiments in which a human identifies the topic(s) of a message, the human may select the topic(s) by selecting personal interest identifiers from a list of identifiers provided by consumers. By identifying a topic that is or corresponds to a personal interest identifier, the message facility of the message distribution system can identify the consumers registered with the system who have input the personal interest identifier. The personal interest identifier is an indication that the user has a personal interest that corresponds to the identifier. The consumer has, by inputting the identifier, requested to receive via the system messages relating to the personal interest, when the topic of the message corresponds to the personal interest identifier. Therefore, when the topic of the message matches a personal interest identifier input by a consumer, the message facility can determine that that consumer is interested in receiving the message.

Accordingly, in block 208, the message facility reviews the consumers and the personal interest identifiers input by the consumers to determine one or more consumers that have input the personal interest identifiers that match or correspond to the topic of the message. In some embodiments, the message facility may identify consumers who have input at least one of the personal interest identifiers for the message, while in other embodiments the message facility may identify consumers who have input all of the personal interest identifiers or some portion of the personal interest identifiers.

Once the message facility identifies the consumer in block 208, the message facility distributes the message to the identified one or more consumers in block 210. In some embodiments, the message facility may distribute the message by making the message available to the identified consumers by storing the message in a data store accessible to the consumer. For example, a data store of the message distribution system may be associated with a consumer and store messages that are to be displayed to a consumer via a user interface of the message distribution system and the message facility may, in block 210, store the message in such a data store. In other embodiments, the message facility may additionally or alternatively relay the message to a consumer in some way, such as by transmitting an electronic mail message or Short Message Service (SMS) text message to the consumer including the message to be distributed or notifying the consumer that the message is available.

Once the message facility distributes the message in block 210, the process 200 ends. Following the process 200, the identified consumer(s) to which the message was distributed may open and review the message and take any suitable action in response to the message, such as by navigating to a business' web site and purchasing products advertised in the message. Additionally, as a result of the process 200, the message distribution system is configured with personal interest identifiers for the consumer(s) and stores a message that was distributed to the identified consumer(s).

As a specific example of the way in which the process 200 may be used to distribute a message, three people may register as consumers with a message distribution system and input to the system the identifier "Indian food" to indicate that the consumers have a personal interest in Indian food. By inputting the identifier "Indian food" to the system, the three people have requested to receive via the system any messages that relate to Indian food, because their personal interest in the subject means they may be interested in contents of any such messages. Subsequently, a proprietor of an Indian food restaurant may contact the message distribution system to distribute a message regarding the restaurant via the message distribution system. The message regarding the restaurant may be a daily specials list, a notice regarding a grand opening, a coupon for eating at the restaurant, or any other suitable message that may be distributed by an Indian food restaurant. In this case, the Indian food restaurant may act as a promoter and the message distribution system may distribute the message to one or more consumers on behalf of the restaurant. When the content of the message is provided to the message distribution system, one or more topics of the message may be determined for the message, which may identify that the message relates to Indian food. As a result, the personal interest identifier "Indian food" may be identified for the message. Because the personal interest identifier "Indian food" was input by the three people to request to receive messages related to Indian food, when the message distribution system distributes the message to consumers based on personal interest identifiers for the message, the message is distributed to the three people via the message distribution service. The three people may then open and read the message via a user interface of the message distribution and may visit the restaurant.

Figure 3:
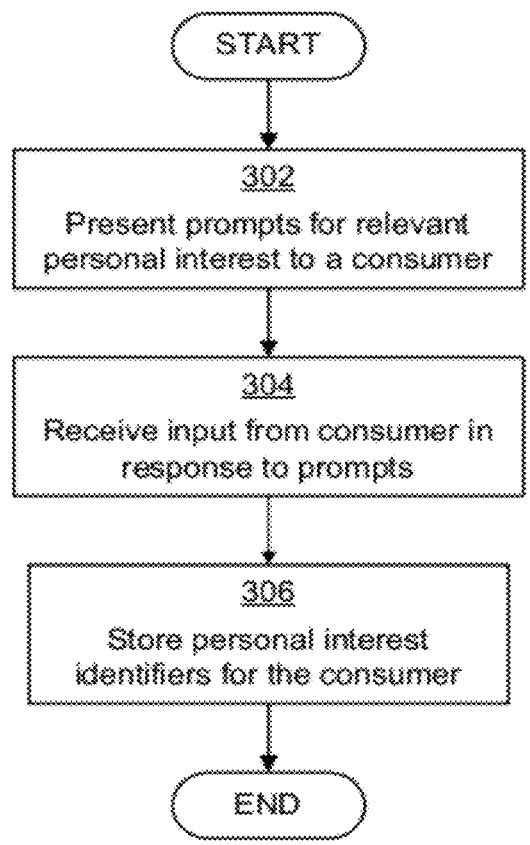
FIG. 3 is a flowchart of an exemplary process for receiving personal interest identifiers for a consumer in response to prompts.

As mentioned above, the message distribution system may receive personal interest identifiers for consumers in any suitable manner. FIG. 3 illustrates one exemplary process that may be implemented in some embodiments for receiving personal interest identifiers for a consumer.

Prior to the start of process 300 of FIG. 3, a consumer may have elected to register with the message distribution system to receive messages via the message distribution system. A registration facility of the message distribution system may have prompted the user to input information to be maintained in a consumer profile, such as a username to identify the consumer in the system and a password for the consumer to access the system. Embodiments may also collect other information for a consumer, but are not limited to collecting any particular types of information regarding a consumer. For example, the consumer's birthdate and/or age may be collected (in the case of a human consumer) such that the system can determine whether the consumer is old enough to receive adult-themed messages. As other examples, a consumer's name, mailing address, e-mail address, phone number, and gender may be collected. In some embodiments, a message distribution system may refrain from requesting any information that may personally identify a consumer outside the system, in the real world, so as to avoid privacy implications or potential intrusions into privacy, while in other embodiments the system may make entry of such information by the consumer optional.

The process 300 of FIG. 3 may be carried out as part of the registration process to identify the consumer, who is newly-registering with the system, some personal interest identifiers that can be used for the consumer. The registration facility may interact with a consumer to receive personal interest identifiers and provide the identifiers to an identifier facility to be stored as discussed above in connection with block 202 of FIG. 2.

In particular, the process 300 may be used to receive input from a consumer of personal interest identifiers for personal interests that have been determined to be relevant to the message distribution system. Prior to the start of the process 300, an administrator of the message distribution system may have identified personal interests that may be relevant to the system. Personal interests that may be relevant in some embodiments may include hobbies, favorite musicians, favorite television shows, favorite restaurants, desired travel destinations, and so on. Once the relevant personal interests have been identified by the administrator, the administrator may configure the system to prompt a consumer during a registration process to provide input of personal interest identifiers for the relevant personal interests. The prompts may be in the form of questions, such as "What are your favorite hobbies?" and "What are your favorite stores?"

The process 300 begins in block 302, in which, as part of the registration process, the consumer is presented with the prompts for the relevant personal interests. The prompts may be presented in any suitable manner, including via a user interface of the message distribution system, like one or more web pages. The prompts may be presented to the consumer as a list of prompts that the consumer can review. In some embodiments, all of the prompts may be optional, such that the consumer is not required to enter any personal interest identifiers and can instead provide personal interest identifiers to the system for the prompts in which the consumer actually has a personal interest.

The consumer is enabled to provide input in response to the prompts that will be stored by the system as personal interest identifiers for the consumer. Accordingly, in block 304, the registration facility receives from the consumer one or more personal interest identifiers. The personal interest identifiers may include one or more personal interest identifiers received in response to a single prompt. As mentioned above, in embodiments the personal interest identifiers may be textual identifiers for personal interests and the registration facility may accept as input any suitable text that a user may input for a personal interest identifier, such as alphabetic, numeric, or punctuation symbols.

In block 306, the registration facility provides the received personal interest identifiers to the identifier facility of the message distribution system and the identifier facility stores the identifiers in any suitable manner, including as discussed above in block 202 of FIG. 2. In some embodiments, the identifier facility may store the personal interest identifiers received from the consumer in response to the prompts regardless of whether the personal interest identifiers were previously stored by the message distribution system. In this way, the consumer may not be bounded by what personal interest identifiers the consumer is able to input and is not limited to any particular personal interest identifiers (e.g., personal interest identifiers pre-selected by an administrator of the system). Instead, the consumer may input an identifier for any suitable personal interest and the personal interest identifier will be stored even when the personal interest identifier was not previously stored by the system.

After the personal interest identifiers are stored in block 306, the process 300 ends. Following the process 300, the message distribution system is configured with and stores personal interest identifiers for a consumer that is newly-registered with the system and is therefore able to distribute messages to the consumer that match the personal interest identifiers.

In the exemplary process 300 of FIG. 3, the input received from a consumer in response to a prompt is stored as a personal interest identifier. In some embodiments, personal interest identifiers may be additionally or alternatively be set based on a processing of the input provided by the consumer. For example, the registration facility and/or the identifier facility may analyze input provided by a consumer in response to a prompt and determine from the analysis personal interest identifiers to be stored for the consumer. For example, if the consumer is prompted for the consumer's favorite sports team and the consumer indicates that the team is the Boston Red Sox, in some embodiments the identifier facility may store "Boston" and "Red Sox" as personal interest identifiers for the consumer. Additionally, the identifier facility may store "sports" as a personal interest identifier for the consumer, as the consumer has, through the input provided in response to the prompt, indicated an interest in sports. Additionally, for similar reasons, the identifier facility may store "baseball" as a personal interest identifier for the consumer, or the names of particular players of the Boston Red Sox, or identifiers for other personal interests that are related to Boston, the Red Sox, and/or baseball/sports. Similarly, if the consumer indicates that the consumer enjoys Indian food, in some embodiments the identifier facility may add one or more personal interest identifiers related to Indian food, to exotic foods, to Indian culture, and/or to specific Indian restaurants to the consumer's set of personal interest identifiers. The identifier facility may add these other personal interest identifiers based on a relationship that the identifier facility is aware of between the actual input provided by the consumer and these other personal interests (e.g., the relationship between the Red Sox and baseball) and based on an assumption that if the consumer has one personal interest, the consumer may be likely to have the other personal interests.

Figure 4:
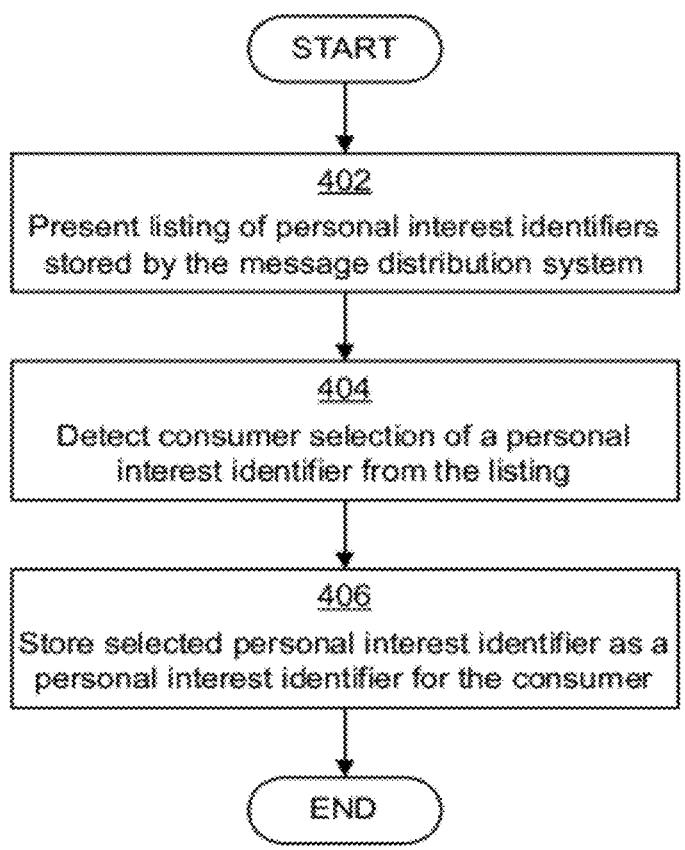
FIG. 4 is a flowchart of an exemplary process for receiving personal interest identifiers for a consumer in response to a consumer selecting the identifiers in an interface.
Figure 5:
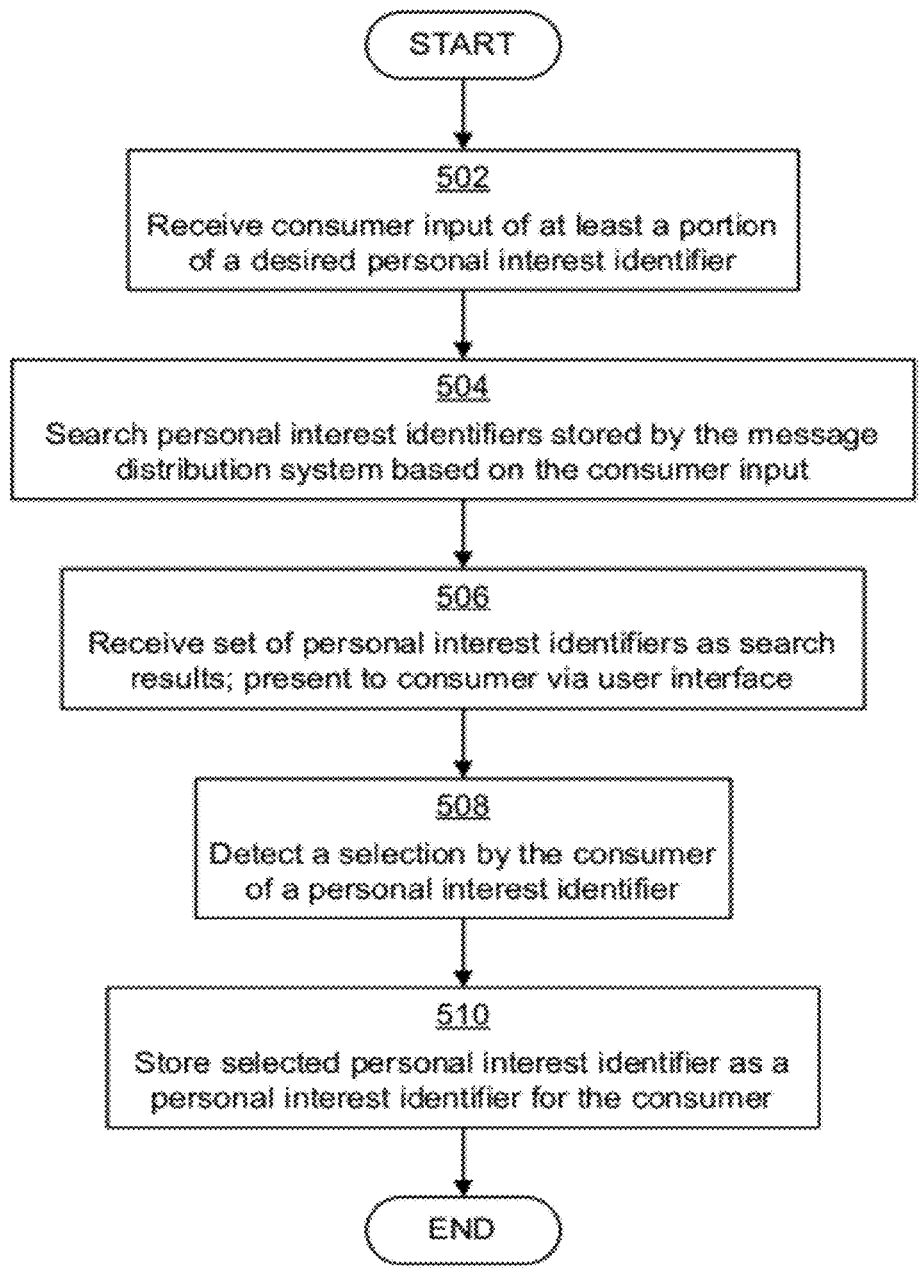
FIG. 5 is a flowchart of an exemplary process for receiving personal interest identifiers for a consumer in response to a consumer searching for and selecting identifiers.

The process 300 of FIG. 3 is one way that personal interest identifiers may be set for a consumer based on input received from a consumer. FIGS. 4-5 illustrate two other techniques that may be used in some embodiments to receive personal interest identifiers from a consumer. Some embodiments may include a message distribution system that includes all of the processes of FIGS. 3-5. In some such embodiments, a consumer may first be optionally prompted by the process 300 of FIG. 3 and, after providing input in response to the prompts or after skipping the prompts and not providing input, may later carry out one or both of the processes of FIGS. 4-5. In other embodiments, a message distribution system may not include one or more of the processes of FIGS. 3-5, such as by not including the process 300 of FIG. 3.

The process 400 of FIG. 4 may be used to enable a consumer to review a listing of personal interest identifiers and select identifiers that were previously stored by the message distribution system, either as a result of being configured with the identifiers by an administrator or previously receiving the identifiers as input from one or more consumers. Accordingly, prior to the start of the process 400, the message distribution system stores a set of personal interest identifiers. Also prior to the start of process 400, a consumer registers with the system, logs in to the system, and requests to change the set of personal interest identifiers that the consumer has input to the system. The process 400 may be carried out in response to the consumer's request.

The process 400 begins in block 402, in which the identifier facility of the message distribution system presents to the consumer a user interface including a listing of personal interest identifiers stored by the system. The listing of personal interest identifiers may be sorted or filtered in any particular manner for presentation via the user interface.

In some embodiments, personal interest identifiers may be associated in the system with a category of personal interests, such as products/stores/commercial topics, news/politics/entertainment, geographic places, hobbies, and organizations. A consumer may be able to specify personal interest identifiers for each category, so as to specify the consumer's interests with a finer granularity. For example, a consumer may input an identifier to signal that the consumer is interested in information about the Boston Red Sox with respect to both the news and the hobbies categories, but may not provide an identifier relating to the Boston Red Sox for the product category, so as to indicate that the consumer is not interested in Red Sox-themed products. As another example, a consumer may indicate with respect to the hobbies category that the consumer is interested in movies, but not indicate with respect to the entertainment category that the consumer is interested in movies, which might signal the consumer is an amateur filmmaker and is interested in material relating to movie hobbyists but is not interested in general information about professionally-produced movies. Accordingly, a consumer may be able to input different personal interest identifiers for each category and may be able to input the same personal interest identifier for two or more categories.

In embodiments that use categories, when the identifier facility presents the listing of personal interest identifiers in block 402, the personal interest identifiers may be displayed according to the categories into which the personal interest identifiers are sorted. For example, the personal interest identifiers for one category may be displayed or the personal interest identifiers for multiple categories may be displayed and organized according to category. Additionally or alternatively, in some embodiments that use categories, a color coding scheme may be used, such that a color used to display a personal interest identifier (e.g., a text color or a background color) may indicate a category of the identifier.

Additionally, in some embodiments, when a listing of personal interest identifiers is presented via a user interface of a message distribution system, some personal interest identifiers may be presented along with additional information regarding the personal interest identifier. For example, when a personal interest identifier relates to a business, information about the business may be displayed in connection with the personal interest identifier. In some embodiments, where a web page forms at least a part of the user interface, when a consumer holds a cursor over a personal interest identifier for which additional information is available, a window may be displayed that includes the additional information. Any suitable information may be displayed as additional information for a personal interest identifier. For example, a link to a web site related to the personal interest identifier (for example, a link to a business' web site) may be displayed.

In block 404, once the listing has been presented to the consumer, the identifier facility detects a selection by the consumer of one or more personal interest identifiers in the listing in the user interface. When the user interface is one or more web pages, the identifier facility may detect the selection by receiving at the web page on the computing device operated by the consumer an indication that the personal interest identifiers have been selected and/or by receiving such an indication at a server, communicated to the server via a network from the computing device operated by the consumer.

Once the indication of the selected personal interest identifier(s) has been received in block 404 by the identifier facility, the identifier facility stores the personal interest identifiers for the consumer in block 406. The personal interest identifiers may be stored in any suitable manner, including as discussed above in block 202 of FIG. 2.

After the personal interest identifiers are stored in block 406, the process 400 ends. Following the process 400, the message distribution system is configured with and stores personal interest identifiers for the consumer and is therefore able to distribute messages to the consumer that match the personal interest identifiers.

FIG. 5 illustrates another technique that may be used to configure a message distribution system with personal interest identifiers for a consumer. Similar to the process 400 of FIG. 4, the process 500 of FIG. 5 may be used to enable a consumer to review a listing of personal interest identifiers and select identifiers that were previously stored by the message distribution system. Accordingly, prior to the start of the process 400, the message distribution system stores a set of personal interest identifiers. Further, a consumer has registered with the system and has logged in to the system and requested to change the set of personal interest identifiers that the consumer has input to the system.

The process 500 begins in block 502, in which an identifier facility of the message distribution system receives from a consumer input of at least a portion of a desired personal interest identifier. The input may include one or more characters that form at least a portion of the desired personal interest identifier, such as one or more alphabetic characters.

In block 504, the identifier facility searches the personal interest identifiers stored by the message distribution system based on the input received in block 502. For example, where the input includes one or more characters, the search may be conducted for personal interest identifiers that contain the string of characters. The identifier facility may search for personal interest identifiers that contain the string in any suitable location within the personal interest identifier. For example, the identifier facility may search for personal interest identifiers that contain the string of characters at the beginning of the identifier, in the middle of the identifier, or at the end of the identifier. As a specific example, if the consumer inputs the letters B-O-S in block 502, the identifier facility may perform a search in block 504 that could identify "Boston," "Boston Red Sox," "Boston Symphony Orchestra," and "Hugo Boss" as potential personal interest identifiers to be selected.

The set of personal interest identifiers that are searched by the identifier facility may include those identifiers that have been input to the message distribution system by an administrator and/or by consumers. As discussed above in connection with FIG. 4, in some embodiments personal interest identifiers may be sorted into categories. In some such embodiments, a user may select, as part of providing the input in block 502, which category is to be searched, and the identifiers of that category may be searched. Additionally, as discussed in detail below in connection with FIG. 8, in some embodiments a message distribution system may enable an administrator to feature some personal interest identifiers as "hot" identifiers. An administrator can feature personal interest identifiers under any suitable circumstances, including when the administrator determines that featuring the identifiers may interest consumers or when a promoter or other entity has requested and/or paid to have certain identifiers featured. In embodiments that feature identifiers, when identifiers have been featured, a set of featured identifiers may be searched in block 504 along with other identifiers.

The searching of block 504 may also include any suitable filtering to determine a set number of search results. For example, the search results may be filtered such that the results do not include any personal interest identifiers that the consumer requesting the search has already input to the message distribution system. This may be done so that the consumer is not presented with search results that the consumer is likely not to be interested in, as the consumer is likely not interested in selecting again identifiers the consumer has already input. Further, the search results may be filtered such that only a maximum number of personal interest identifiers are displayed to the consumer for selection. The maximum number of results may include a maximum number of featured identifiers and a maximum number of other identifiers that may or may not be featured identifiers. When the unfiltered search results include more than the maximum number of identifiers or featured identifiers, the maximum number of each type may be returned as the search results. In other cases, such as where the unfiltered results include fewer than the maximum number of featured identifiers, the search results may include more unfeatured identifiers such that the maximum number of identifiers is returned to the consumer. In the case that the unfiltered results include fewer than the maximum number of identifiers, then all of the unfiltered results may be returned. The filtering that is carried out to determine which of the unfiltered results to return as a result may be carried out in any suitable manner, as embodiments are not limited in this respect. In some embodiments, for example, the identifiers that are most popular in the system because the highest number of other consumers have input the identifiers to the system may be chosen to be included in the filtered results. In other embodiments, additionally or alternatively, where featured identifiers that a promoter or other entity paid to feature are used, the featured identifiers chosen to be included in the filtered results may include those identifiers for which the highest payment was received at the system.

Additionally, in some embodiments, the search results may be sorted as part of the searching of block 504. For example, the results may be sorted alphabetically or according to any other sorting scheme, as embodiments are not limited in this respect.

In block 506, once the identifier facility receives results of the search of block 504, the identifier facility presents the results of the search to a consumer via a user interface. In block 508, the identifier facility detects a selection by the consumer of a personal interest identifier in the user interface and, in block 510, stores the selected personal interest identifier for the consumer. The detecting and storing of blocks 508, 510 may be carried out in any suitable manner, including according to techniques discussed above in connection with blocks 404, 406 of FIG. 4.

After the personal interest identifiers are stored in block 510, the process 500 ends. Following the process 500, the message distribution system is configured with and stores personal interest identifiers for the consumer and is therefore able to distribute messages to the consumer that match the personal interest identifiers.

Figure 6:
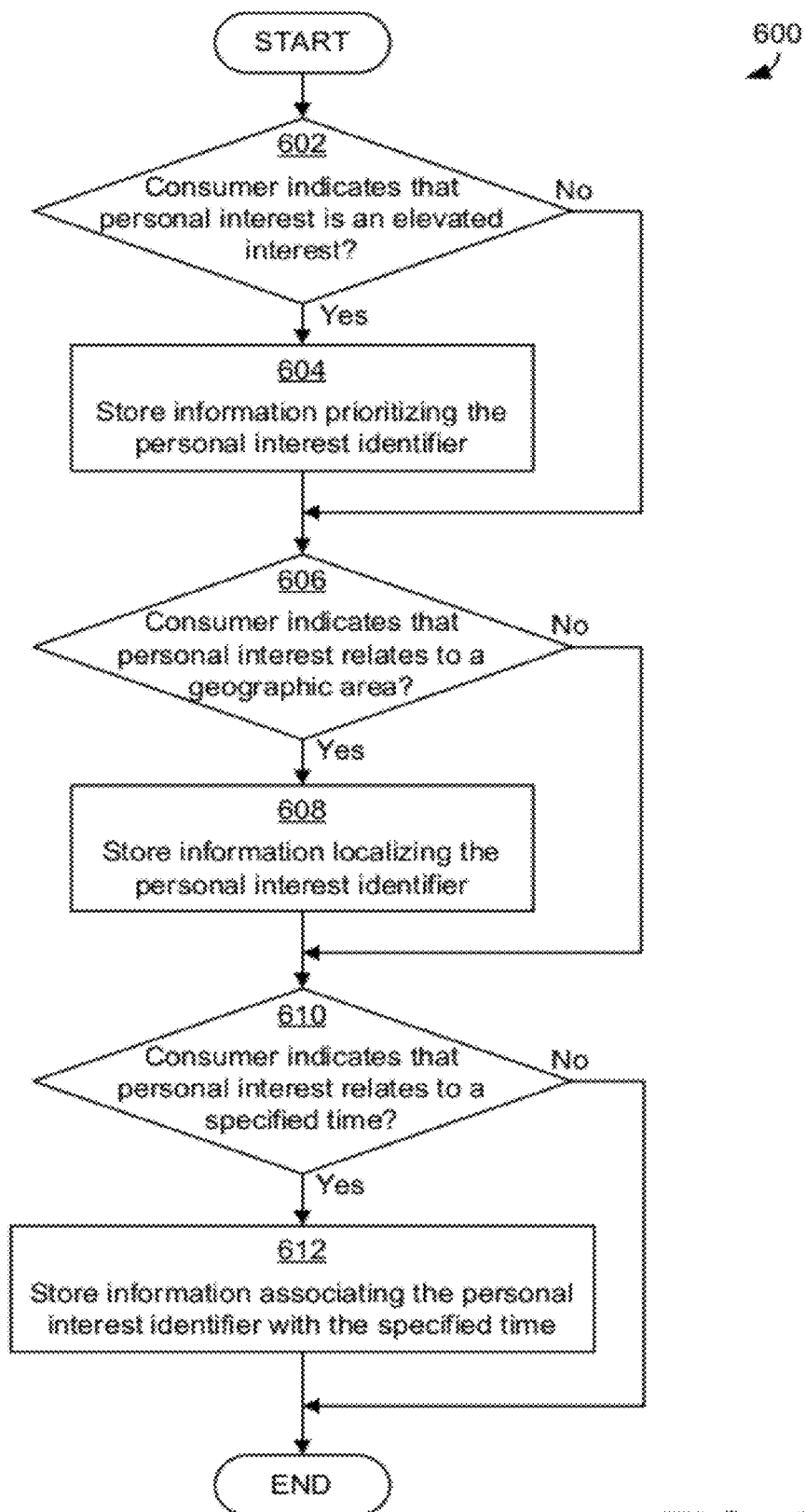
FIG. 6 is a flowchart of an exemplary process for setting options for a personal interest identifier in response to input from a consumer.

In some embodiments, in addition to being able to input personal interest identifiers to a message distribution system, a consumer may be enabled to set options with respect to a personal interest identifier to qualify the personal interest of the consumer that is identified by the personal interest identifier. FIG. 6 illustrates one process that may be used in some embodiments to set three exemplary options for personal interest identifiers. It should be appreciated that embodiments are not limited to setting any or all of the options discussed in connection with FIG. 6 and that other options are possible.

Prior to the start of the process 600 of FIG. 6, a message distribution system is configured with a set of one or more personal interest identifiers for a consumer and may be able to distribute messages to the consumer based on the personal interest identifiers. Alternatively, the process 600 may be carried out while a consumer is inputting one or more personal interest identifiers to the system and before the message distribution system is fully configured with the personal interest identifiers. The process 600 may be used by the consumer to set options regarding a personal interest identifier input to the system by the consumer.

The process 600 begins in block 602, in which an identifier facility of the message distribution system determines whether the consumer has indicated, for a personal interest identifier, whether the personal interest identified by the identifier is an elevated interest of the consumer. An elevated interest of a consumer may be a personal interest that is particularly important to the consumer or a personal interest about which the consumer is particularly interested in receiving messages. As discussed in detail below, when a message is directed to a consumer based on a personal interest identifier that the consumer has indicated is an elevated interest, the message may be highlighted in some way or otherwise identified as potentially-important for the consumer. Additionally, as discussed below, in message distribution systems that bill a promoter for messages distributed to consumers based on personal interest identifiers, the system may charge a higher rate for distributing a message to a consumer who has indicated an elevated interest in the topic of the message.

Accordingly, if in block 602 the identifier facility determines that the consumer indicated that the personal interest is an elevated interest, then in block 604 the identifier facility stores information "prioritizing" the personal interest identifier to indicate that the personal interest is an elevated interest. The information that prioritizes the personal interest identifier may be stored in any suitable manner, including as a true/false value or other value indicating that an identifier to which the value relates is prioritized.

Once the identifier facility stores the information in block 604, or if the identifier facility determines that the consumer did not indicate an elevated interest in block 602, then in block 606 the identifier facility determines whether the consumer indicated that the personal interest relates to a geographic area. In some cases, a personal interest of a consumer may extend only to a certain geographic area, such as restaurants within the consumer's hometown or news information within the consumer's country/province of residence. When the consumer's personal interest extends only to a certain area, it is advantageous for the message distribution system to identify the certain geographic area, such that messages can be distributed to the consumer when the message relates to the personal interest and to the certain geographic area, rather than merely when the message relates to the personal interest.

Accordingly, if in block 606 the identifier facility determines that the consumer has indicated that the personal interest relates to a geographic area, then in block 608 the identifier facility stores information localizing the personal interest identifier by indicating the geographic area. The geographic area may be indicated by the stored information in any suitable manner. In some embodiments, the geographic area may be indicated by a ZIP code or other value that indicates a geographic area and that is stored by the system with the personal interest identifier.

Once the identifier facility has stored in the information in block 608, or if the identifier facility determines in block 606 that the consumer has not indicated that the personal interest relates to a geographic area, in block 610 the identifier facility determines whether the consumer has indicated that a personal interest relates to a specified time. Similar to a personal interest that relates to a particular area, a personal interest of a consumer may relate to a particular time. For example, the consumer may only be interested in restaurants at night, music venues on the weekends, or vacations in the summer time. When the consumer's personal interest extends only to a certain time of day, week, or year, it is advantageous for the message distribution system to identify the certain time, such that messages can be distributed to the consumer when the message relates to the personal interest and to the certain time, rather than merely when the message relates to the personal interest.

Accordingly, if in block 610 the identifier facility determines that the consumer has indicated that the personal interest relates to a certain time (and/or day), then in block 612 the identifier facility stores information associating the personal interest identifier with the certain time by indicating the time. The certain time may be indicated by the stored information in any suitable manner. In some embodiments, the certain time may be indicated by a numeric value or other value that indicates a certain time and that is stored by the system with the personal interest identifier.

Once the identifier facility has stored the information in block 612, or if the identifier facility determines in block 610 that the consumer did not indicate that the personal interest relates to a specific time, then the process 600 ends. Following the process 600, the message distribution system is configured to distribute messages to consumers based on not only the personal interest identifiers but also based on options that may have been set for the personal interest identifiers to clarify further the nature of the consumer's personal interest.

Described above are various techniques that may be used by a consumer to add personal interest identifiers to a system and to associate the personal interest identifiers with the consumers. In some embodiments, a consumer may also be able to remove personal interest identifiers from the consumer's profile in the system to disassociate the consumer and the personal interest identifiers, such as when the consumer is no longer interested in receiving messages related to the personal interest. In some such embodiments, removing the personal interest identifier may leave the system configured with the personal interest identifier (particularly when other consumers have input the personal interest identifier), but may instead only prevent the system from distributing to the consumer messages related to the personal interest identifier. Processes similar to the processes discussed above may be used to remove personal interest identifiers. For example, a listing of the personal interest identifiers input by the consumer may be presented to a consumer via a user interface and, when the identifier facility detects a selection by the consumer of one or more personal interest identifiers, the identifiers may be removed from a storage relating the identifiers to the consumer.

In the examples of FIGS. 3-6, a consumer provided input regarding personal interest identifiers to be set by the consumer. In some embodiments, a consumer may carry out processes, such as the processes described above, to add and/or remove personal interest identifiers in the consumer's discretion at any time. In other embodiments, however, a consumer may be enabled only to set personal interest identifiers at set times. For example, a consumer may be enabled to set personal interest identifiers only when registering with the message distribution system, only at the beginning of a quarter, etc. Further, in some embodiments, a message distribution system may limit the types of changes that may be made by a consumer. For example, in some embodiments a consumer may be able to add new personal interest identifiers, but may not be permitted to modify or remove personal interest identifiers.

Figure 7:
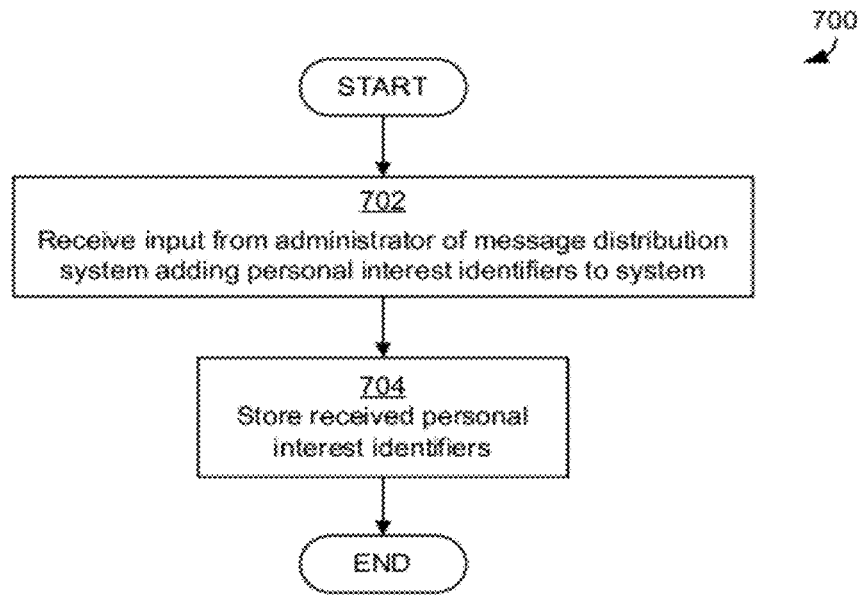
FIG. 7 is a flowchart of an exemplary process for receiving personal interest identifiers from an administrator of a message distribution system.
Figure 8:
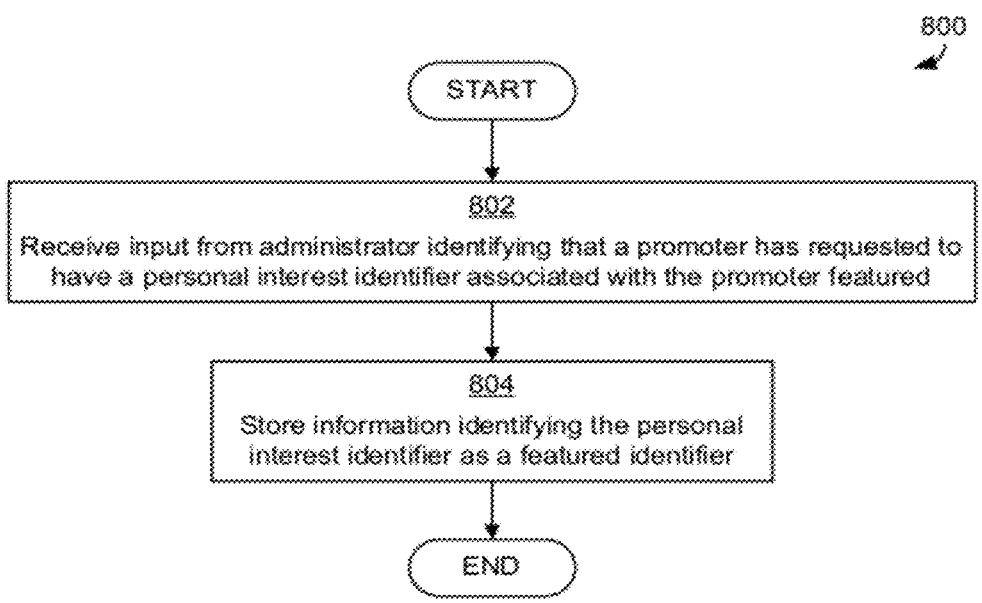
FIG. 8 is a flowchart of an exemplary process for featuring personal interest identifiers in a message distribution system.

In the techniques discussed in connection with FIGS. 3-6, a message distribution system is configured with personal interest identifiers based on input received from consumers. Embodiments are not limited to configuring a system with identifiers or configuring identifiers based only on input received from consumers. FIGS. 7-8 illustrate examples of the types of information that may be received from an administrator of a message distribution system to configure the message distribution system with personal interest identifiers.

FIG. 7, in particular, illustrates a technique that may be used in some embodiments for an administrator to add personal interest identifiers to a message distribution system. The process 700 of FIG. 7 may be used when a message distribution system is initially being configured, such that the system can store some personal interest identifiers before any consumers register with the system and so that consumers can then select from those personal interest identifiers (as in the processes of FIGS. 4-5 discussed above). The process 700 of FIG. 7 may additionally or alternatively be used at any time to add new personal interest identifiers to a message distribution system.

The process 700 begins in block 702, in which an identifier facility of the message distribution system receives from an administrator input that adds personal interest identifiers to the system. The input may be in the form of a single personal interest identifier or in the form of a set of multiple personal interest identifiers. In some embodiments, a message distribution system may be able to receive from the administrator multiple personal interest identifiers in a file that can be parsed by the system, such as via a file in a comma-separated values (CSV) format. If the input received in block 702 from the administrator includes multiple identifiers in a certain format, the receiving of block 702 may include parsing the input to determine the multiple personal interest identifiers.

In block 704, once the input is received, the identifier facility stores the received personal interest identifiers in a data store of the message distribution system. The personal interest identifiers may be stored in any suitable data store, including data stores of personal interest identifiers discussed above. For example, in some embodiments a single database table of personal interest identifiers may be maintained, with each row of the table including a personal interest identifier and an indication of a consumer or multiple consumers who have input the identifier. In such an embodiment, when the identifier facility stores the personal interest identifiers in block 704, the identifiers may be stored without an indication of a consumer that has input the identifiers, as the identifiers received in block 704 may not have been previously input by any consumers. In some embodiments, to ensure that the data store of the message distribution system does not contain unnecessary data, before personal interest identifiers are stored in block 704, the identifier facility may determine whether any of the personal interest identifiers were previously stored by the system and, if so, not store the personal interest identifiers again.

Once the identifier facility stores the personal interest identifiers in block 704, the process 700 ends. Following the process 700, the message distribution system is configured with additional personal interest identifiers that may be selected by consumers so as to indicate a personal interest that corresponds to the identifiers. The identifiers could be input by the consumers in any suitable manner, including according to techniques discussed above in connection with FIGS. 4-5.

While FIG. 7 illustrates a process for adding identifiers to a system, it should be appreciated that a similar process could be carried out in some embodiments for removing identifiers from a system. Such a process may include inputting one or more personal interest identifiers to an identifier facility (as in block 702 of FIG. 7) and, with the identifier facility, removing the personal interest identifiers from a data store of the message distribution system. The personal interest identifiers may, in some embodiments, be removed only when the personal interest identifiers are not associated with any consumers at the time the removal is requested (e.g., were not input by a consumer or a consumer has not requested to remove the identifier). In other embodiments, though, the administrator may be enabled to remove personal interest identifiers from the system even in the case that a consumer has added the identifier, to prevent messages from being distributed according to undesired personal interest identifiers.

FIG. 8 illustrates a process that an administrator may use to set an option for a personal interest identifier in the system. As discussed above in connection with FIG. 5, in some embodiments a message distribution system may enable some personal interest identifiers to be featured in the system, which might encourage consumers to input those personal interest identifiers to request to receive information related to the personal interest identifiers. For example, the featured identifiers could be returned as search results that can be selected by the consumers to input the identifiers, as discussed above. As another example, in some embodiments a system may have a user interface (e.g., one or more web pages) that presents a listing of "hot" identifiers to consumers such that the consumers can view the featured identifiers and select from the list to associate the identifiers with the consumers' profiles so as to receive information based on the identifiers.

Prior to the start of the process 800 of FIG. 8, a message distribution system is configured with at least one personal interest identifier. Some of the personal interest identifiers may be associated with a promoter, such as by being the name of a promoter (e.g., the brand for a product or name of a business) or a topic associated with the promoter (e.g., "Thai food" when the promoter is a Thai restaurant). Additionally, the promoter may have registered with the message distribution system such that the message distribution system is able to distribute messages on behalf of the promoter.

The process 800 begins in block 802, in which an identifier facility of the message distribution system receives input from an administrator identifier that the promoter has requested to have one or more specified personal interest identifiers featured. In some embodiments, the request from the promoter may be accompanied by payment, such that the personal interest identifiers that are featured by the system are those that the promoter has paid to feature. In other embodiments, identifiers may be featured by an administrator without payment. A promoter may request that the identifiers be featured such that the identifiers are seen and selected by more consumers. This is in the promoter's interests when the promoter intends to distribute messages via the system based on those personal interest identifiers, as the promoter can distribute the message to more consumers when more consumers have input the identifiers and thereby requested to receive messages based on those identifiers.

The input received in block 802 may, in some embodiments, include information identifying a level at which to feature the personal interest identifiers. The level at which to feature the identifiers may affect a way in which featured identifiers are presented to consumers, such as a presentation format or ordering of featured identifiers. In some embodiments, a featured identifier may be associated with a weight on a scale of 1 to 100. When featured identifiers are presented in a listing to consumers, the identifiers may be sorted according to the weights, such that identifiers with higher weights are displayed higher in the list. By displaying the identifiers with higher weights higher in the list, consumers may be more likely to see and select the identifiers.

In block 804, the identifier facility stores information identifying that the personal interest identifiers are featured. Where the input of block 802 identifies a level at which to feature the identifiers, the information identifying that the personal interest identifiers are featured may include the level. Additionally, a time that the personal interest identifier was featured may be stored in some embodiments when an identifier is featured. Further, in embodiments that categorize personal interest identifiers as discussed above, an administrator may be able to feature an identifier in a particular category. In such embodiments, information that is stored when an identifier is featured may include information identifying a category in which the identifier is featured.

Once the identifier facility stores the information in block 804, the process 800 ends. As a result of the process 800, the message distribution system is configured with featured identifiers and may present those featured identifiers to consumers to be selected by the consumers.

Figure 9:
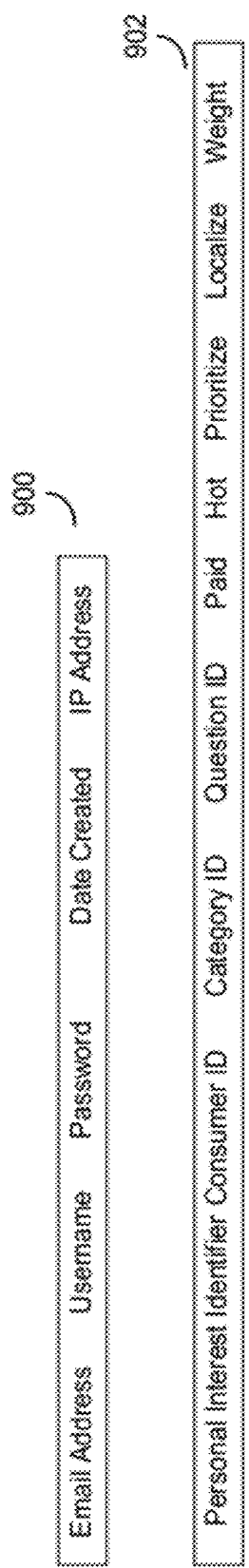
FIG. 9 is a block diagram of an exemplary format of storing information regarding personal interest identifiers.

FIGS. 3-8 discussed various ways in which information regarding consumers and personal interest identifiers may be managed and stored by a message distribution system. In some embodiments, the information may be stored by the system in one or more database tables of one or more databases. FIG. 9 illustrates the format of two tables that may be used in some embodiments to store information regarding consumers and personal interest identifiers.

Table 900 of FIG. 9 illustrates the format of one row of a database table that may be used to store information regarding a consumer. While not illustrated in the example of FIG. 9, the information that is stored for a consumer may also include information identifying a consumer outside of the message distribution system, such as a first name and last name, that may not be collected by a system in all cases to limit the privacy implications of information stored for a consumer and limit the potential risk of invasion of privacy by storing private information about a consumer. The information of table 900 may form a part of a consumer profile that is managed by the message distribution system for a consumer. In some cases, the consumer profile that is managed may not include sufficient information to personally identify a consumer outside of the message distribution system. The information stored in table 900 may include an e-mail address and/or mobile phone number for the consumer to be used to communicate with the consumer outside the system, such as by notifying the consumer via e-mail or SMS message that there are messages waiting to be viewed by the consumer, and a username and password to enable the consumer to access the system. Lastly, the table 900 includes a date/time that the consumer profile for the consumer was created and an Internet Protocol (IP) address of the computing device used by the consumer to register with the message distribution system.

Table 902 of FIG. 9 illustrates the format of one row of a database table that may be used to store information regarding a personal interest identifier. As discussed above, various types of information may be stored for a personal interest identifier. In particular, the identifier itself may be stored as well as a username for a consumer that has input the personal interest identifier. In the embodiment of FIG. 9, a unique row 902 of a database table is created for each unique pair of personal interest identifier and consumer. In other embodiments, though, a single row may be created for each personal interest identifier that stores usernames for each of the consumers who have added the identifier. In embodiments that organize personal interest identifiers in categories, the table 902 may additionally store a category ID for the category in which the personal interest identifier has been placed. In connection with FIG. 3, techniques were described for receiving personal interest identifiers as input in response to prompts from the message distribution system. In embodiments that use such prompts, the table 902 may also include a question ID identifying the prompt that led to the personal interest identifier being input by the consumer. Information regarding options for a personal interest identifier may also be stored, including whether a promoter has paid for an identifier to be featured, whether the identifier is featured, whether the consumer has "prioritized" the identifier to indicate an elevated interest, and whether the consumer has "localized" the identifier to indicate an interest in a particular geographic area. When an identifier has been localized, information may be stored in table 902 in any suitable manner. In some embodiments, for example, the "localize" field of table 902 may be used as a flag to indicate whether the identifier has been localized and information regarding the geographic area may be appended to the personal interest identifier itself. For example, when the consumer indicates that the consumer is interested in Thai restaurants in downtown Boston, the localized personal interest identifier may be stored in table 902 as "Thai restaurants 02210" and the localize field of the table 902 may be set to a value indicating that localization has been carried out. Though, it should be appreciated that embodiments may store localization information in any suitable manner, as embodiments are not limited in this respect. Lastly, when a personal interest identifier has been featured and the administrator has provided input regarding a level of featuring for the identifier, a weight for the identifier (which may be between 1 and 100) may be stored for the identifier.

It should be appreciated that while exemplary formats for data are illustrated and discussed in connection with the tables of FIG. 9, embodiments are not limited to storing information in any particular format.

Described above in connection with FIGS. 3-9 are various ways of storing and managing personal interest identifiers for a message distribution system. As discussed above, personal interest identifiers are used by a message distribution system, in accordance with techniques described herein, to distribute messages to consumers who have input those personal interest identifiers. In particular, a topic of a message is determined that corresponds to one or more personal interest identifiers and the consumers that have input those personal interest identifiers are identified. Because, by inputting the personal interest identifiers to the system, the consumers have requested to receive messages related to the personal interests to which the personal interest identifiers relate, when a message has a topic that corresponds to the personal interest identifiers (and therefore the personal interests), the consumers have effectively requested to view the message. Messages may therefore be distributed by the message distribution system, on behalf of promoters, to consumers who have requested to receive the message and are interested in receiving the message. By doing so, the message distributed for the promoter may reach an audience of consumers who are actually interested in the content of the message and may be likely to take an action in response to the message, such as by buying advertised products.

Figure 10:
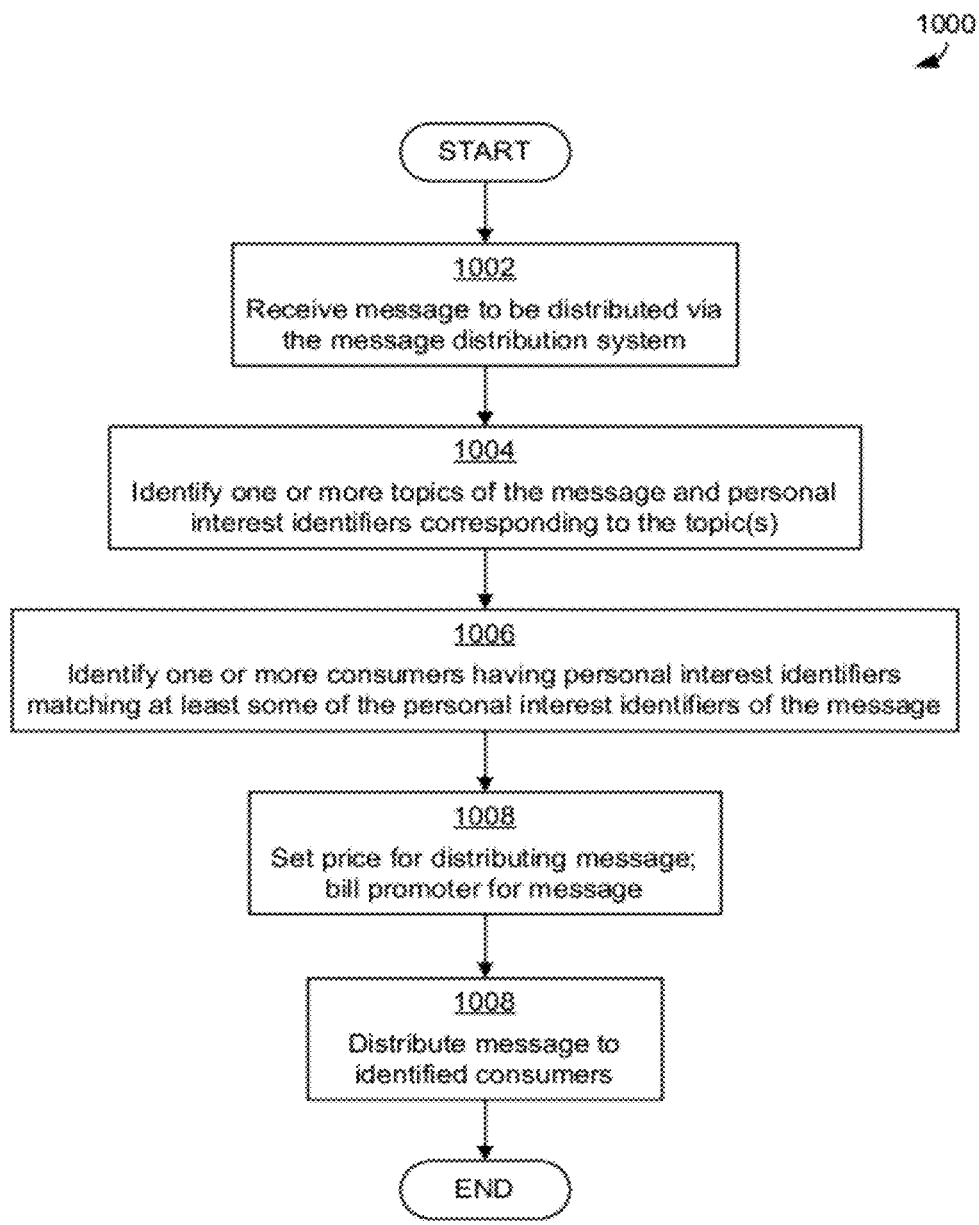
FIG. 10 is a flowchart of an exemplary process for distributing a message according to one or more topics of a message and one or more personal interest identifiers for one or more consumers.

FIG. 10 illustrates one technique for operating a message distribution system to distribute messages based on personal interest identifiers. Prior to the process 1000 of FIG. 10, one or more consumers has registered with the message distribution system and each input one or more personal interest identifiers that indicate personal interests of the consumer(s). A promoter has also registered with the message distribution system and has requested that a message be distributed via the system on behalf of the promoter. As discussed above, the message may be any suitable message having any suitable content. As one example, a message may be an advertisement including textual and image content relating to a product that is sold by the promoter. As another example, a message may be an invitation to an event that the promoter is holding or sponsoring, and the message may include date/time information related to the event and a description of the event. As a third example, a message may be a newsletter or political message distributed by a promoter to spread the information contained in the newsletter/political message. The process 1000 may be used to distribute any message having any content via the system on behalf of the promoter.

The process 1000 begins in block 1002, in which a message facility of the message distribution system receives a message to be distributed on behalf of the promoter. Embodiments are not limited to operating with messages of any particular type or format. In some embodiments, the message may be formatted as an HTML document, as discussed above. Further, the message that is received may be received in any suitable manner, as embodiments are not limited in this respect. In some embodiments, the message facility may receive from a computing device of the promoter a complete specification of the message, including content of the message and formatting of the message. In such a case, the promoter may upload the message to the message facility via a user interface of the message facility, such as a web page. In other embodiments, the promoter or an administrator of the message distribution system may use a user interface of the message facility to create the message. For example, a "What You See Is What You Get" (WYSIWYG) editor may be included in a web page presented to the promoter and/or to the administrator and may be used to create a message to be distributed via the system.

In block 1004, the message facility identifies one or more topics of the message. The topic(s) of a message may be determined based on any suitable characteristic of a message. Characteristics of a message may include information regarding a promoter for the message, a time or manner in which the message is sent, criteria used to specify consumers to which to distribute the message (as discussed in detail below), and content of the message that is explicitly contained in the message or implied by the message (e.g., a meaning of the message). Based on the topics, one or more personal interest identifiers that are stored by the system may be identified for the message by the message facility.

In some embodiments, the topics that are identified by the message facility may be personal interest identifiers, while in other cases a set of one or more topics may be identified first, after which personal interest identifiers related to those topics may be identified. The topics and identifiers may be identified in any suitable manner. In some cases, an automated process for evaluating content of a message may be implemented, which may evaluate syntax and/or semantics of a message to determine a topic of the message. Where such an automated process is used, any suitable automated process may be used, including processes that are or will be known in the art for evaluating syntax and/or semantics to determine a topic of a message. Additionally or alternatively, a human may identify a topic of a message and/or personal interest identifiers for a message. In some embodiments, a human may be presented, via a user interface of the message distribution system, with a listing of personal interest identifiers stored by the system. The listing may indicate, in some cases, a number of consumers who have input each of the personal interest identifiers and thereby indicate a number of consumers the message may be distributed to if the personal interest identifier is selected for the message. The message facility may then detect a selection by the human of one or more personal interest identifiers to be associated with the message.

In some embodiments, a review process may be further carried out to determine whether the personal interest identifiers identified in block 1004 actually do correspond to content of the message to be distributed. Such a review process may be conducted by an administrator of the message distribution system and may be conducted to ensure that messages are being distributed to consumers who will be interested in the content of the message. A review process may reduce or eliminate the chance that a personal interest identifier that is not related to a content of the message is accidentally selected for the message. Further, such a review process can reduce or eliminate the chance that spam messages will be distributed via the system when a personal interest identifier unrelated to the content of the message is purposefully selected for the message merely for the purpose of distributing the message to a large number of consumers.

Once the message facility has identified the personal interest identifiers for the message in block 1004, a set of one or more consumers to which to distribute the message is identified. The set of one or more consumers may include those consumers that have input personal interest identifiers matching the identifiers selected for the message. As mentioned above, when there is a match between personal interest identifiers a consumer has input to the system to request messages and personal interest identifiers for a message, the system can determine that the consumer will be interested in the content of the message to be distributed. The consumers that the message facility identifies in block 1006 may be those consumers who have input every personal interest identifier selected for the message, at least one of the personal interest identifiers selected for the message, or some portion of the personal interest identifiers selected for the message.

In block 1008, after the personal interest identifiers for the message and the consumers to whom the message will be distributed are identified, the message facility may set a price for distributing the message. The price that is set may be based on any suitable factors, including the number of personal interest identifiers set for the message and/or the number of consumers to which the message will be distributed. In some cases, a message distribution system may have a set price per consumer to which the message is distributed. Additionally, in some embodiments, the system may have a higher price for distributing the message to a consumer that set one or more options for the personal interest identifier by which the consumer was selected to receive the message. This may be the case, for example, where the consumer has prioritized a personal interest identifier to indicate an elevated interest in that personal interest. Because the consumer has indicated that the consumer is very interested in receiving messages based on that personal interest identifier, the system may charge a higher price for distributing the message to the consumer based on that personal interest identifier. Other options that may be set by a consumer may be used to adjust the price, such as localizing a personal interest or specifying a time related to a personal interest. Other business considerations may affect the price set for a message, such as a bulk discount for distributing a message to a large number of consumers, a preferred customer discount, a sale price, or other factors. Based on an evaluation of these factors, the message facility determines the price for distributing the message via the message distribution system on behalf of the promoter. The price may then be presented to the promoter and payment may be received.

After the price is determined (and, in some embodiments, after payment is received), the message facility distributes the message to the identified consumers in block 1010. The message may be distributed in any suitable manner. In some cases, the message may be distributed to consumers immediately, while in other cases the message may be scheduled for distribution at some later time. The distribution of the message may take the form of adding the message to a data store of the system related to and accessible by the consumer. For example, a data store of the message distribution system may be associated with a consumer and store messages that are to be displayed to a consumer via a user interface of the message distribution system and the message facility may, in block 1010, store the message in such a data store. In other embodiments, the message facility may additionally or alternatively relay the message to a consumer in some way, such as by transmitting an electronic mail message or Short Message Service (SMS) text message to the consumer including the message to be distributed or identifying that a message is available to the consumer. For example, in some embodiments a message facility may periodically (e.g., daily, weekly, etc.) notify a consumer by sending the consumer a communication outside of the message distribution system, such as by e-mail, SMS, or other protocol, that one or more messages are available for the consumer's review.

Once the message facility distributes the message in block 1010, the process 1000 ends. Following the process 1000, the identified consumer(s) to which the message was distributed may open and review the message and take any suitable action in response to the message, such as by navigating to a business' web site and purchasing products advertised in the message. Additionally, as a result of the process 1000, the message distribution system is configured with personal interest identifiers for the consumer(s) and stores a message that was distributed to the identified consumer(s).

The process 1000 of FIG. 10 was described as identifying consumers to which to distribute messages based on personal interest identifiers input by consumers and one or more topics of a message. In some embodiments, other criteria may be specified by which to filter the consumers to which the message is to be distributed. For example, a promoter may specify that the message should be distributed to men who have personal interests related to the topic of the message, or should be distributed to people who live in Massachusetts and have personal interests related to the topic of the message. As another example, where the topic of a message is adult-themed, the message distribution system and/or the promoter may specify that the message should only be distributed to consumers over the age of 18 or over 21. As another example, a promoter may specify that the message should only be distributed to consumers who have recently expressed interest in the topic of the message by inputting a related personal interest identifier within a certain time period (e.g., the last 30 days). Any suitable criteria may be used to filter the consumers to which a message is to be distributed.

Figure 11:
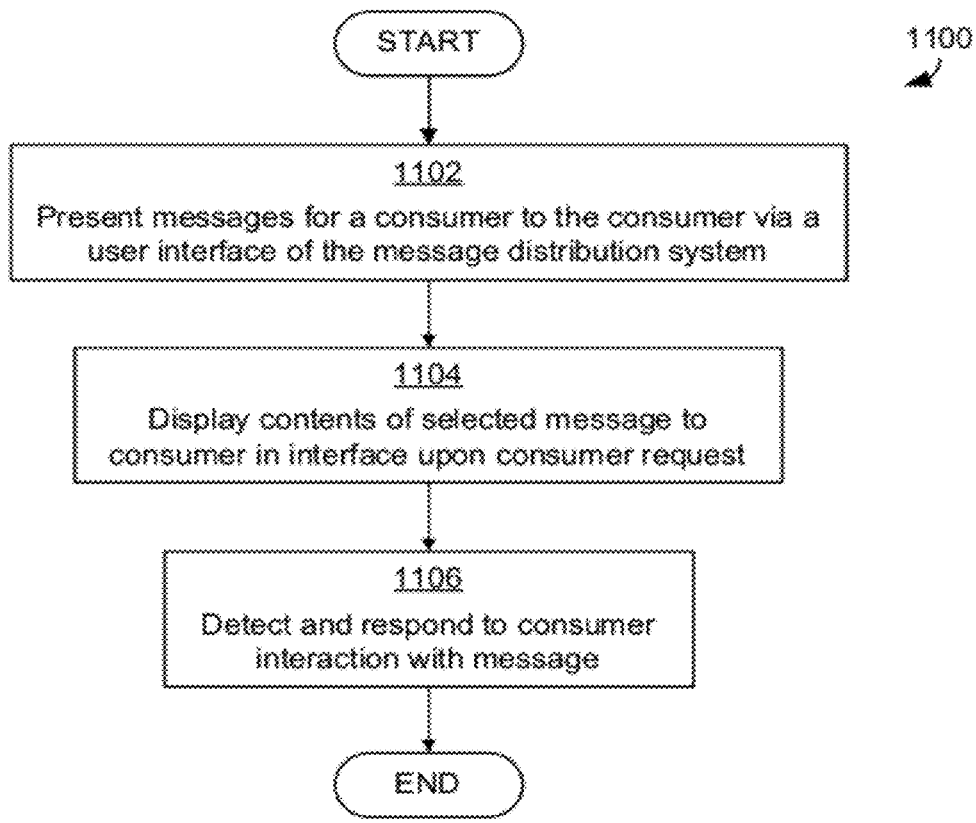
FIG. 11 is a flowchart of an exemplary process for presenting a message to a consumer to be reviewed by the consumer.

Consumers may receive and review messages that were distributed to them via the system in any suitable manner. In some embodiments, where the messages include visual content such as text, images, and/or video, the messages may be viewed by a consumer via any suitable user interface. In some embodiments, such a user interface may be one or more web pages stored by a server of the message distribution system and relayed to a computing device operated by the consumer to be presented to the consumer. FIG. 11 shows one technique for presenting messages to consumers via a user interface of the message distribution system.

Prior to the start of the process 1100 of FIG. 11, a message distribution system may have received a message, identified consumers to which to distribute the message (such as via the process 1000 of FIG. 10), and made the message available to consumers. For example, the message may be stored in a data store associated with the consumer and accessible to the consumer. The process 1100 begins in block 1102, in which a message facility creates and presents to the consumer a user interface including one or more messages that have been distributed to the consumer via the message distribution system. The user interface may have been created by retrieving from the data store information about the messages that are available to the consumer. The user interface may include information regarding messages in any suitable format. In some embodiments, the user interface may include a summary of the messages that are available to the consumer, such as, for each message, an identification of the promoter on behalf of which the message was distributed, a subject line or title of the message, a date/time the message was distributed, and possibly a short excerpt of the message. In some embodiments that categorize personal interest identifiers as discussed above, a user interface may present information regarding messages based on the categories. For example, when a consumer has specified a category for a personal interest identifier, and that category and personal interest identifier were used to identify that the message should be distributed to the consumer, when the message is presented in the user interface the message may be presented with an indication of the category. For example, where a message is displayed in a user interface, a display style such as a color scheme for the message may be set based on the category. Additionally, in some embodiments that enable a consumer to prioritize a personal interest identifier so as to indicate an elevated interest, when a message is presented to the consumer that corresponds to the prioritized identifier, the message may be highlighted in the user interface in some manner. For example, the message may be displayed with a particular icon or color that indicates that the message corresponds to a prioritized personal interest identifier, or messages may be sorted such that the messages that correspond to prioritized identifiers are presented first in a list of messages.

The user interface may enable a consumer to retrieve additional information about the message, such as the entire content of a message, by selecting the message. Accordingly, when a consumer selects a particular message in the user interface, in block 1104 the user interface of the message facility may display the content of the selected message to the consumer. The user interface in which the contents are selected may also present to a user various opportunities to interact with the message. For example, the user interface may enable a consumer to delete a message or archive a message by placing the message into a different data store to be maintained for the consumer. The user interface may additionally or alternatively enable a consumer to provide a rating of a message indicating whether the consumer liked or disliked the message, was interested in or disinterested in the content, etc. Further, the user interface may enable a consumer to create an event entry for a calendar of the consumer corresponding to the message, such as when the message is an invitation to an event. The message facility may therefore, in block 1106, detect and respond to consumer interactions with the message by storing information in a data store of the message distribution system in response to user interactions. For example, the message facility may store information indicating whether a consumer has opened and reviewed the full contents of the message, has deleted or archived the message, has provided a rating for the message, or has created a calendar entry based on the message.

Figure 12:
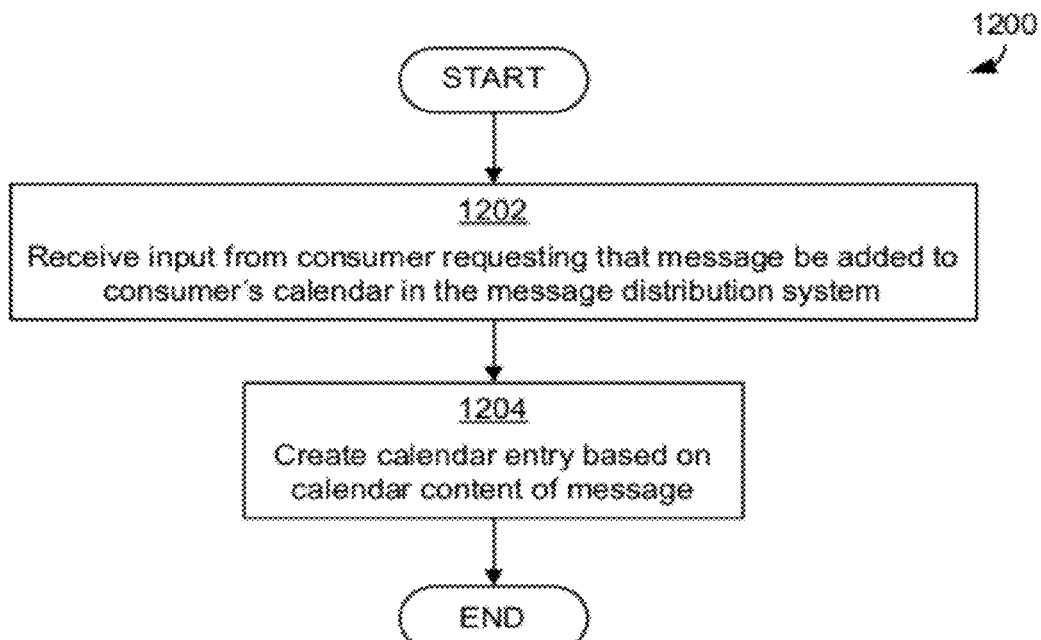
FIG. 12 is a flowchart of an exemplary process for creating a calendar entry for a consumer corresponding to a message.

Once the message facility has detected and responded to consumer interactions with the message in block 1106, the process 1100 ends. As a result of the process 1100, information in a data store regarding the message for the consumer may have been edited, such as to indicate the user interactions with the message. Additionally, as a result of editing the information regarding the message for the consumer, the message facility of the message distribution system may be able to calculate various statistics regarding how multiple consumers have interacted with the message, such as a number of consumers who opened and reviewed the full contents of the message, a number of consumers who rated the message and what the average rating was, the number of consumers who created a calendar entry based on the message, etc.

Where a message distribution system enables a consumer to create a calendar entry corresponding to a message, a message facility may carry out any suitable process to create the calendar entry. FIG. 12 illustrates one exemplary technique that may be implemented by a message facility to create a calendar entry. Prior to the start of the process 1200 of FIG. 12, a message is distributed to a consumer that includes information regarding an event, such as a day and/or time and the consumer may have opened and reviewed the full contents of the message. The process 1200 begins in block 1202, in which a message facility receives input from a consumer requesting that a calendar entry be added to a consumer's calendar. In particular, the input from the consumer may request that an entry be added to the calendar for the consumer that is maintained by the message distribution system. In some embodiments, including the embodiment of FIG. 12, the message distribution system may include a user interface that includes a calendar and displays the calendar via a user interface of the system that includes events at dates/times indicated by the calendar. In response to the request received from the consumer in block 1202, the message facility reviews content of the message to identify date/time information indicated in the message and creates, in block 1204, a calendar entry based on the content of the message. In particular, the message facility creates a calendar entry with the date/time information indicated in the message and that may have details of the event set in the entry based on the content of the message. For example, a subject line or title of the message and/or full content of the message may be used as details of the calendar entry regarding the event to which the calendar entry relates. The message facility then stores the calendar entry in a data store of the message distribution system related to the calendar for the consumer. The process 1200 then ends. As a result of the process 1200, the message distribution system stores information related to an event in connection with a calendar for the consumer, such that when the consumer requests to view the calendar, the user interface including the calendar can be populated according to the calendar entry and presented to the consumer.

It should be appreciated that, while in some embodiments a message facility may be adapted to create a calendar entry for a calendar maintained by the message distribution system, embodiments are not limited to operating with such a calendar. In other embodiments, a message facility may additionally or alternatively present to a consumer a calendar entry to be used with calendars maintained outside of the message distribution system. For example, a calendar entry may be presented to a consumer for use with a Google® Calendar or a Microsoft® Outlook® calendar. Where such outside calendars are used, the calendar entry may be presented to a consumer as a downloadable file that the consumer may download and then use to add to an outside calendar, or the message facility may be adapted to use an Application Programming Interface (API) for one or more outside calendars to access the outside calendars and add the entry upon request by a consumer. An entry for any suitable calendar may be created and added to a calendar in any suitable manner, as embodiments are not limited in this respect.

Figure 13:
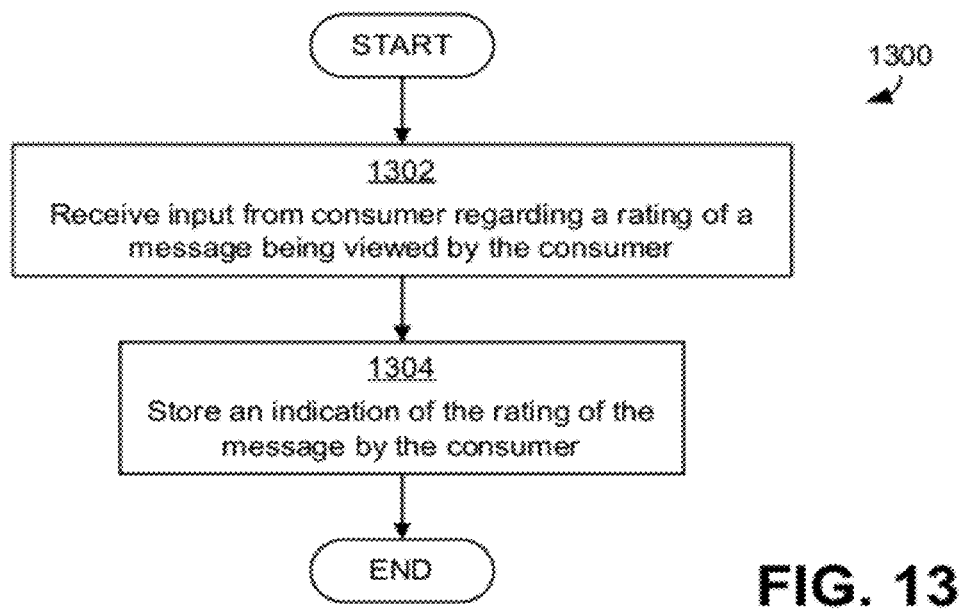
FIG. 13 is a flowchart of an exemplary process for receiving input from a consumer regarding a rating of a message by the consumer.

As discussed above, in some embodiments a user interface by which a consumer may review a message may enable the consumer to provide a rating of the message. FIG. 13 illustrates one technique that may be used by a message distribution system to detect and respond to a rating of a message by a consumer. Prior to the start of the process 1300 of FIG. 13, a message is distributed to a consumer and the consumer opens and reviews the full contents of the message. The process 1300 begins in block 1302, in which a message facility of the message distribution system receives input from a consumer regarding a rating of the message. The input may have been provided by the consumer via a user interface of the message distribution system by which the consumer views the contents of the message. For example, the user interface may include one or more buttons or prompts that may be used by a consumer to provide feedback. In one example of such a user interface, the user interface may include "thumbs up" and "thumbs down" buttons that a consumer may use to provide a rating of the message. As another example, the user interface may include buttons for the consumer to provide a rating on a scale of 1-5, 1-10, or any other suitable scale, such that the consumer can provide a rating in that manner. Any suitable style of rating and any suitable style of input can be used. The rating may be provided by the consumer according to the consumer's impression of the message and the content of the message, which may indicate whether the consumer liked/disliked the message or whether the consumer found the content interesting. Once the input regarding the rating is received from the consumer, in block 1304 the message facility stores the indication of the rating of the message by the consumer in a data store of the message distribution system, and the process 1300 ends. Following the process 1300, the message distribution system stores the rating of the message and is able to relay the rating of the message to the promoter on behalf of which the message was distributed. In some embodiments, the rating of the message by the consumer may be combined with other ratings by other consumers to provide an overall indication of ratings by consumers, such as a count of each type of rating or an average rating by consumers.

While in the example of FIG. 13, the consumer was able to provide a rating in the form of a positive/negative indication or a numeric score. It should be appreciated that embodiments are not limited to receiving ratings of messages from consumers in any specific form. Rather, in some embodiments, a consumer may be able to provide any suitable feedback regarding a message, including textual feedback.

As mentioned above, a message distribution system as described herein may, in some embodiments, charge promoters for distributing messages to consumers on behalf of the promoters. The price charged for each message may depend on a variety of factors, including a number of personal interest identifiers selected for the message based on the topic of the message and/or the number of consumers to which the message is distributed based on the personal interest identifiers. In addition, as discussed above, the price for a message may be set based on whether a consumer to which the message is to be distributed has prioritized a personal interest identifier to indicate that the consumer has an elevated interest in the personal interest identified by the personal interest identifier.

Figure 14:
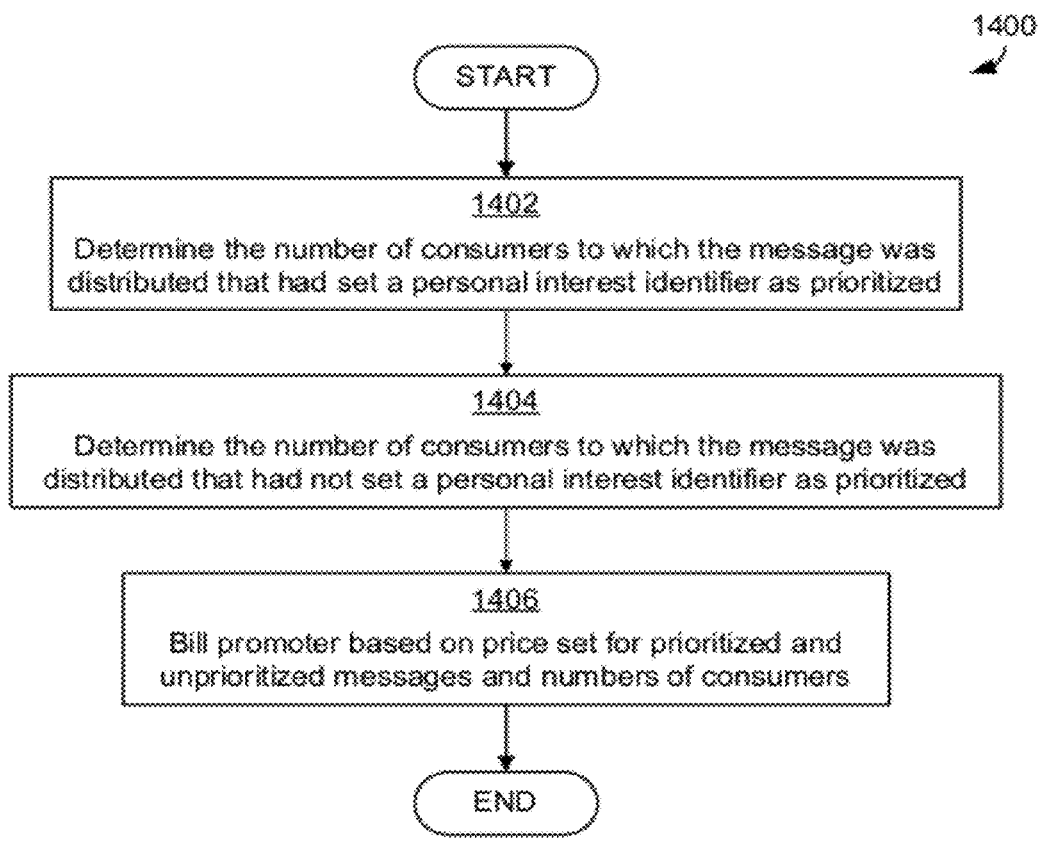
FIG. 14 is a flowchart of an exemplary process for determining a price to charge a promoter for distributing a message on behalf of the promoter.

FIG. 14 illustrates one exemplary technique that may be used in some embodiments for setting a price of a message based on whether personal interest identifiers for a message have been prioritized by consumers to which the message is to be distributed. Prior to the start of the process 1400 of FIG. 14, a message is received by a message facility of a message distribution system, personal interest identifiers are determined for the message based on a topic of the message, and consumers to which the message is to be distributed are determined based on the personal interest identifiers. The process 1400 begins in block 1402, in which the message facility determines a number of unique consumers to which the message is to be distributed that have prioritized one or more of the personal interest identifiers for the message. Next, in block 1404, the message facility determines a number of unique consumers to which the message is to be distributed that have not prioritized any of the personal interest identifiers for the message. In block 1406, the message facility applies two prices to the numbers determined in blocks 1402 and 1404. The first price is a price for a "prioritized message,"

which is a message that is being sent to a consumer based on a prioritized personal interest identifier, while the second price is a price for a non-prioritized message. The message facility multiplies the first price by the number determined in block 1402 and multiplies the second price by the number determined in block 1404 to determine a price to charge for distribution of the message. Once the price is determined, in block 1406 the message facility bills a promoter based on that price, such that the message distribution system can be paid for distributing the message to consumers on behalf of promoters. Once the promoter is billed for distribution of the message, the process 1400 ends.

Described in connection with FIGS. 10-14 are various techniques for managing messages distributed by message distribution system to consumers on behalf of promoters. In connection with these techniques, information may be stored by the message distribution system. Embodiments are not limited to any particular manner of storing information. In some embodiments, information regarding messages may be stored in one or more database tables of one or more databases. FIG. 15 illustrates three exemplary formats of three database tables that may be used in some embodiments.

Table 1502 of FIG. 15 includes, in each row of the table 1502, information related to a message that is to be distributed via the message distribution system. The table 1502 includes, for a message, an identification of the message (e.g., a numeric identifier) and an identification of a promoter on behalf of which the message is to be distributed. Additionally, the table 1502 includes an identification of a category of the message. As discussed above, in some cases, personal interest identifiers may be sorted into categories. As a result, messages that are to be distributed based on those personal interest identifiers may be sorted into the same or similar categories, and the table 1502 may store for a message an indication of the category. Table 1502 may also include content of a message, such as content of a subject line of a message and content of the full content of a message. The content of the subject line or message may include any suitable content, including visual and/or audible content, such as text, images, video, and/or audio. The table 1502 may further include an identification of any criteria other than personal interest identifiers that are to be used in determining the consumers to which to distribute the message and/or to filter the consumers to which to distribute the message. Exemplary criteria are discussed above, but may include a gender of a consumer, an age of a consumer, a location of a consumer, when a consumer input a personal interest identifier by which the message is to be distributed to the consumer, or a maximum number of consumers to which to distribute the message. The table 1502 also includes flags to indicate when a message includes date/time information relating to an event and when the message includes mature content and should be age-restricted to adult consumers. A price for distributing the message may be stored in table 1502. Additionally, the personal interest identifiers identified for the message based on the topic of the message are stored in table 1502. The table 1502 can also store an indication of a time at which the message is to be distributed to consumers, when the message is scheduled for distribution at a certain time. Lastly, the table 1502 may include various statistics regarding how consumers have interacted with the message following distribution: a total number of consumers who have opened and viewed the message, a total number of "thumbs up" or positive ratings and a total number of "thumbs down" or negative ratings, a total number of times a calendar entry has been created based on a message, a number of times the message has been archived, and a number of times the message has been deleted.

Table 1504 of FIG. 15 includes information regarding messages that have been made available to a consumer. The information of table 1504 may be used to populate a user interface by which a consumer may view messages that have been made available to the consumer. Each row of the table 1504 may include information relating to a unique pair of a message and a consumer to which the message is distributed. The table 1504 includes a message ID for the message and a consumer ID for the consumer. Additionally, the table 1504 may include status information regarding whether the consumer has interacted with the message. The status information may be in the form of flags indicating whether the message is a new message for the consumer (i.e., not yet reviewed by the consumer), whether the consumer has created a calendar entry based on the message, whether the consumer has archived the message, whether the consumer has deleted the message, and whether the consumer has provided a "thumbs up" or "thumbs down" rating of the message. Additionally, as discussed above, a consumer may request that a notification be sent to the consumer outside of the message distribution system when messages are available for the consumer to review. For example, an e-mail or SMS message may be sent to the consumer when there are messages available for the consumer to review. Accordingly, the table 1504 may additionally include a flag for whether a notification has been sent to the consumer since the message was made available to the consumer.

The message distribution system may also maintain a table 1506 of information regarding when a message was viewed by a consumer. The table 1506 may include, for each row, an identifier for the consumer and an identifier for the message and include an indication of a time that the consumer opened and reviewed contents of the message.

It should be appreciated that while exemplary formats for data are illustrated and discussed in connection with the tables of FIG. 15, embodiments are not limited to storing information in any particular format.

In some embodiments, in addition to an identifier facility to manage personal interest identifiers for consumers and a message facility to manage messages to be distributed on behalf of promoters, a message distribution system may include a query facility that performs searches of information stored by the message distribution system. The query facility may enable consumers and/or promoters to perform searches of the information to determine statistics or other information about the aggregate of information relating to individual consumers, messages, promoters or other parts of the message distribution system. For example, the query facility may enable a consumer and/or promoter to determine, for one or more personal interest identifiers, an aggregate number of consumers who have input the personal interest identifiers, which may indicate a popularity of the personal interest identifier in the system. Further, the query facility may enable a promoter to determine, for a message, an aggregate number of consumers who have opened and reviewed a message or an aggregate number of consumers who have rated a message. As another example, an aggregate number of consumers who have input a personal interest identifier may aid in identifying under-utilized identifiers and consumers that have input the under-utilized identifiers. When such under-utilized identifiers are found, an administrator of the system might send messages to consumers to help make the system more effective or efficient. For example, if some consumers have selected under-utilized identifiers that are equivalent to or similar to other well-used identifiers, the system may recommend to the consumer that the consumer switch to the well-used identifiers or may automatically add the well-used identifiers to the consumers' sets of identifiers. Doing so would enable the consumers to receive messages by ensuring that the consumers are associated with the personal interest identifiers that are being used by other consumers or by promoters. Equivalency or similarity of personal interest identifiers could be measured in any suitable manner, including by measuring the degree of overlap between the consumers associated with each personal interest identifier or by determining the personal interests to which each identifier relates and measuring the equivalency or similarity of the personal interests.

Examples of searches that a query facility may enable are described below in connection with FIGS. 16-18. It should be appreciated, however, that other searches are possible and that a query facility may enable any suitable searches of information maintained by a message distribution system.

Figure 16:
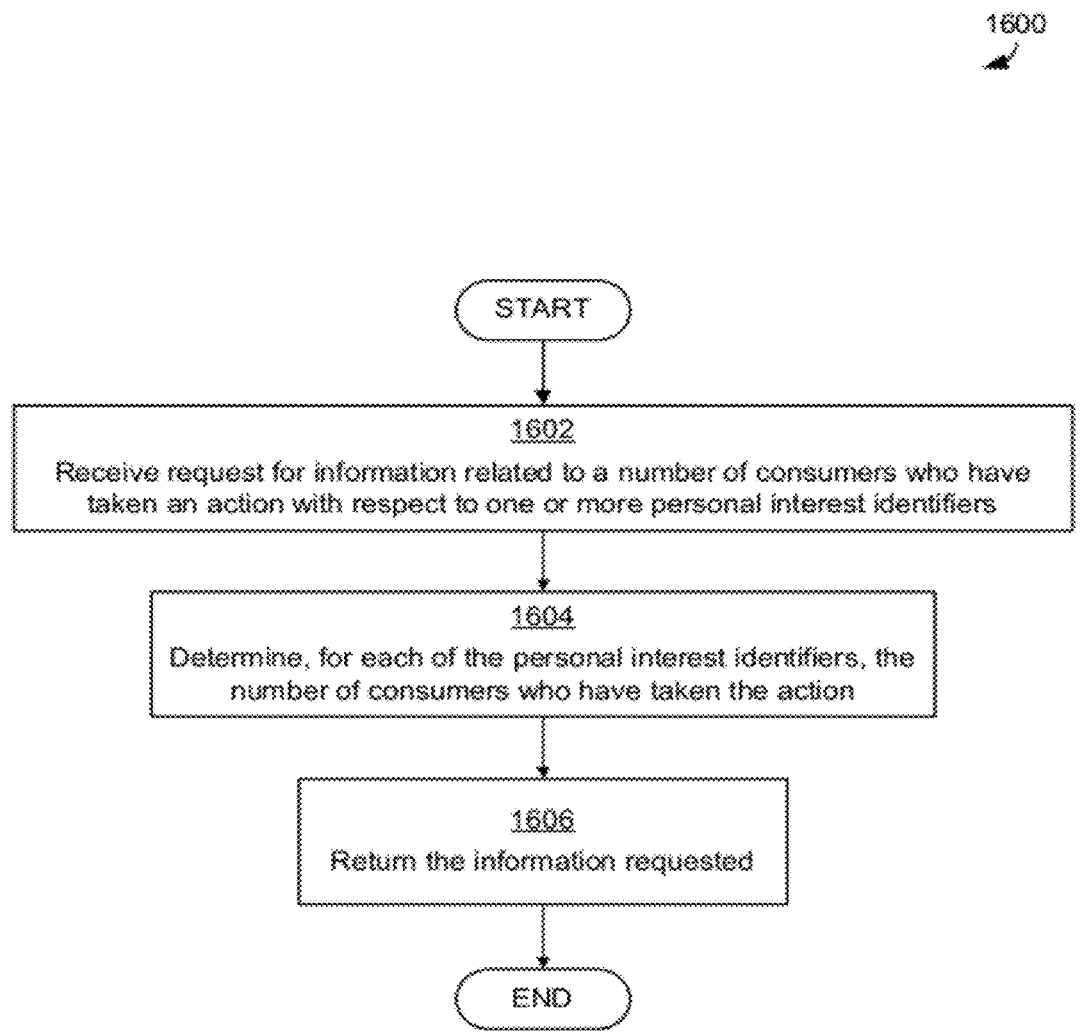
FIG. 16 is a flowchart of an exemplary process for querying a data store of information regarding personal interest identifiers.

FIG. 16 illustrates one exemplary process that may be used in some embodiments to query one or more data stores of information regarding personal interest identifiers. Prior to the start of process 1600 of FIG. 16, personal interest identifiers have been added to the message distribution system and consumers have interacted with the personal interest identifiers in some way to associate the personal interest identifiers with the consumers or take some other action. The process 1600 begins in block 1602, in which a query facility of the message distribution system receives a request for information related to a number of consumers who have taken an action with respect to one or more personal interest identifiers. The request may be received from any suitable entity, including an administrator of the system, a consumer, or a promoter. The action to which the request relates may be any suitable action. In some cases, the action taken by a consumer may be inputting the personal interest identifiers so as to associate the personal interest identifiers with the consumer and thereby request that messages be distributed to the consumer based on the personal interest identifier. In other cases, the action may be prioritizing the personal interest identifiers so as to indicate that the personal interest identifier corresponds to an elevated interest of the consumer. Any suitable action that may be taken by a consumer, a record of which may be stored by the message distribution system, can be evaluated with the request of block 1602.

In block 1604, in response to the request, the query facility determines, for each of the personal interest identifiers for which the request was received in block 1602, how many consumers have taken the action specified in the request. The query facility may determine the number of consumers who have taken the action in any suitable manner, including by reviewing one or more data stores of the message distribution system in any suitable manner, including by retrieving and/or processing information stored by the one or more data stores. In block 1606, once the query facility determines the number of consumers, the information requested in block 1602, including the number of consumers, is returned as a response to the request. Returning the information as a response to the request may include presenting the information to a requestor in any suitable manner. For example, in some embodiments, the information may be presented via a user interface of the system, such as via one or more web pages displayed on a computing device operated by the administrator, consumer, or promoter who made the request received in block 1602. Once the query facility provides the information in block 1606, the process 1600 ends.

The process 1600 may be used in any suitable context to determine any suitable information about personal interest identifiers stored by the message distribution system. In one example, the process 1600 may be used to determine, for each of the personal interest identifiers stored by the system, a number of consumers who have input each personal interest identifiers. The number of consumers for each personal interest identifier may be presented via a user interface as part of displaying a number of consumers of a system, such as when an administrator is explaining the system and the potential for distributing messages to potential promoters. Alternatively, the number of consumers could be displayed to a promoter and/or to an administrator when personal interest identifiers are being identified for a message to be distributed via the system. By viewing the number of consumers who have input each personal interest identifier, those personal interest identifiers associated with high numbers of consumers can be identified and used for distributing the message, and less common personal interest identifiers avoided, such that the message can be distributed to the largest number of consumers who have requested to receive messages related to the topic of the message.

The process 1600 of FIG. 16 may also be used to determine not just a number of consumers who have taken some action, but a number of consumers who have taken some action within a specified time period. FIG. 17 illustrates an exemplary process, similar to the process of FIG. 16, that may be carried out by a query facility in some embodiments to determine popular personal interest identifiers. Popular personal interest identifiers may be the identifiers that were added by the highest numbers of consumers within a time period set by an administrator of the system, such as within the past hour, day, week, etc. Prior to the start of the process 1700 of FIG. 17, one or more consumers have registered with the message distribution system and input one or more personal interest identifiers to request to receive messages related to the personal interests indicated by the personal interest identifiers. The process 1700 begins in block 1702, in which a query facility of the message distribution system receives a request for the most popular personal interest identifiers within a time period. The time period may be specified by the request or may be a default value for all such requests set by an administrator of the message distribution system. The request may be received as part of presenting to a consumer potential personal interest identifiers that the consumer might like to select to be added to the consumer's profile, or may be received as part of presenting to a promoter or administrator potential personal interest identifiers that may be selected for a message. In response to receiving the request, in block 1704 the query facility reviews records of the message distribution system regarding personal interest identifiers and determines all personal interest identifiers that were input by consumers within the time period. From the personal interest identifiers determined in block 1704, the query facility determines in block 1706 the most popular identifiers. In some embodiments, the most popular identifiers may be a set number of identifiers, such as 10, 20, 50, etc., identifiers that were added by the highest number of consumers during the time period. In other embodiments, the most popular identifiers may additionally or alternatively be those identifiers that were added by more than a threshold number of consumers during the time period, such as by more than 100 consumers or more than 1000 consumers. Once the query facility determines the most popular personal interest identifiers in block 1706, in block 1708 the query facility returns the most popular identifiers as a response to the request. The response may be provided in any suitable form. In some embodiments, the response may be provided by presenting a listing of the most popular identifiers via a user interface of the message distribution system. Once the response is provided, the process 1700 ends. Following the process 1700, a consumer can select one of the most popular identifiers to associate the identifier with the consumer, or a promoter or administrator can select one of the most popular identifiers to associate the identifier with a message, such that the identifier can be used to distribute messages based on personal interests of consumers.

Figure 17:
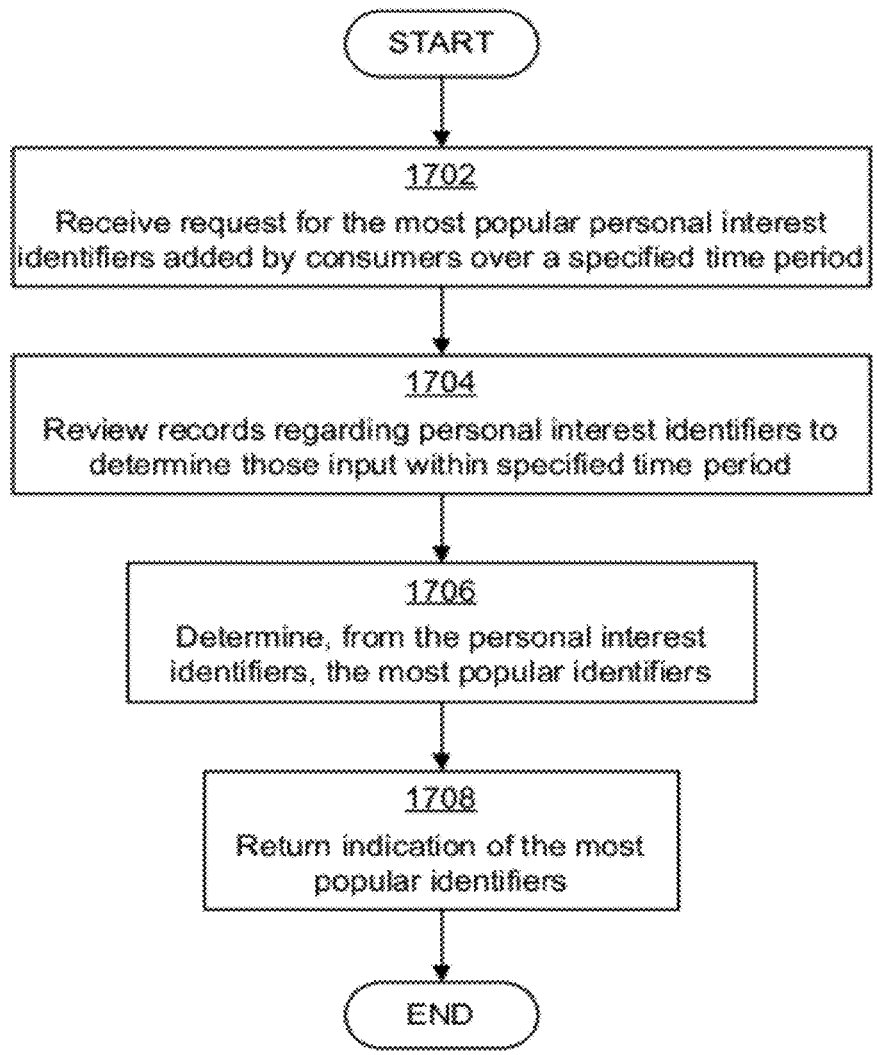
FIG. 17 is a flowchart of an exemplary process for querying a data store of information regarding personal interest identifiers to determine popular personal interest identifiers.

In the examples of FIGS. 16 and 17, a query facility of a message distribution system queries information regarding personal interest identifiers stored by the system. A query facility is not limited to querying information regarding personal interest identifiers. In some embodiments, a query facility may additionally or alternatively query information regarding messages and the manner in which consumers have interacted with messages. Such queries may provide statistics regarding how consumers have interacted with messages that may be relevant to an administrator of the message distribution system and/or to promoters that requested that the messages be distributed.

Figure 18:
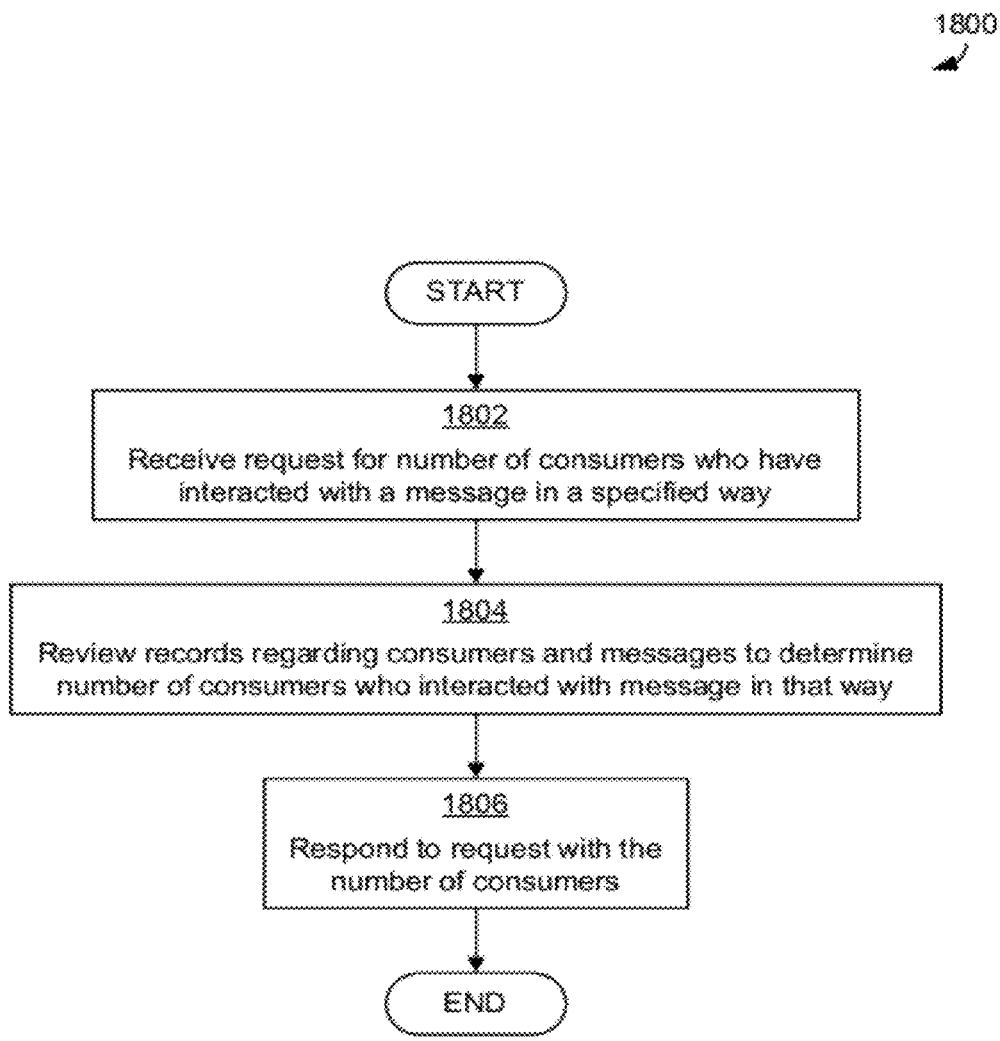
FIG. 18 is a flowchart of an exemplary process for querying a data store of information regarding messages.

FIG. 18 illustrates one technique that may be implemented in some embodiments by a query facility of a message distribution system to determine information regarding a manner in which consumers have interacted with messages. Prior to the start of process 1800 of FIG. 18, consumers have provided personal interest identifiers to the system, a message has been distributed to consumers based on personal interest identifiers relating to topics of the messages and interests of the consumers, and consumers have interacted with the messages in some way. The process 1800 begins in block 1802, in which a query facility of the message distribution system receives a request for a number of consumers who have interacted with a particular message in a specified way. The message may be specified in the request received in block 1802 in any suitable manner, including according to a message identifier used by the system to identify the message. The interaction between the consumers and the message for which the information is requested may be any suitable interaction between a consumer and a message for which records may be maintained by the message distribution system. For example, the request may be for a number of consumers who have opened and reviewed contents of a message, who have rated a message, or who have deleted a message, or any other interaction.

In block 1804, in response to the request of block 1802, the query facility reviews information stored by the message distribution system regarding consumers and messages to determine a number of consumers who have taken the specified action with respect to the message. The query facility may review and/or process the information stored by the message distribution system in any suitable manner to determine this information.

In block 1806, once the query facility determines the number of consumers who have interacted with the message in the specified way, the information requested in block 1802, including the number of consumers, is returned as a response to the request. Returning the information as a response to the request may include presenting the information to a requestor in any suitable manner. For example, in some embodiments, the information may be presented via a user interface of the system, such as via one or more web pages displayed on a computing device operated by the administrator or promoter who made the request received in block 1802. Once the query facility provides the information in block 1802, the process 1800 ends.

Techniques described herein may be implemented in any suitable manner. Included in the discussion above are a series of flow charts showing the steps and acts of various processes that distribute messages to consumers, on behalf of promoters, based on topics of the messages and one or more personal interests of consumers. The processing and decision blocks of the flow charts above represent steps and acts that may be included in algorithms that carry out these various processes. Algorithms derived from these processes may be implemented as software integrated with and directing the operation of one or more single- or multi-purpose processors, may be implemented as functionally-equivalent circuits such as a Digital Signal Processing (DSP) circuit or an Application-Specific Integrated Circuit (ASIC), or may be implemented in any other suitable manner. It should be appreciated that the flow charts included herein do not depict the syntax or operation of any particular circuit or of any particular programming language or type of programming language. Rather, the flow charts illustrate the functional information one skilled in the art may use to fabricate circuits or to implement computer software algorithms to perform the processing of a particular apparatus carrying out the types of techniques described herein. It should also be appreciated that, unless otherwise indicated herein, the particular sequence of steps and/or acts described in each flow chart is merely illustrative of the algorithms that may be implemented and can be varied in implementations and embodiments of the principles described herein.

Accordingly, in some embodiments, the techniques described herein may be embodied in computer-executable instructions implemented as software, including as application software, system software, firmware, middleware, embedded code, or any other suitable type of computer code. Such computer-executable instructions may be written using any of a number of suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functional facilities, each providing one or more operations to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel and/or serially, as appropriate, and may pass information between one another using a shared memory on the computer(s) on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may together form a complete software package. These functional facilities may, in alternative embodiments, be adapted to interact with other, unrelated functional facilities and/or processes, to implement a software program application. In one embodiment, the functional facilities may implement the functionality of the web site operated by Tagzo World LLC of Massachusetts.

Some exemplary functional facilities have been described herein for carrying out one or more tasks. It should be appreciated, though, that the functional facilities and division of tasks described is merely illustrative of the type of functional facilities that may implement the exemplary techniques described herein, and that embodiments are not limited to being implemented in any specific number, division, or type of functional facilities. In some implementations, all functionality may be implemented in a single functional facility. It should also be appreciated that, in some implementations, some of the functional facilities described herein may be implemented together with or separately from others (i.e., as a single unit or separate units), or some of these functional facilities may not be implemented.

Computer-executable instructions implementing the techniques described herein (when implemented as one or more functional facilities or in any other manner) may, in some embodiments, be encoded on one or more computer-readable media to provide functionality to the media. Computer-readable media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable medium may be implemented in any suitable manner, including as computer-readable storage media 1906 of FIG. 19 described below (i.e., as a portion of a computing device 1900) or as a stand-alone, separate storage medium. As used herein, "computer-readable media" (also called "computer-readable storage media") refers to tangible storage media. Tangible storage media are non-transitory and have at least one physical, structural component. In a "computer-readable medium," as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

In some, but not all, implementations in which the techniques may be embodied as computer-executable instructions, these instructions may be executed on one or more suitable computing device(s) operating in any suitable computer system, including the exemplary computer system of FIG. 1, or one or more computing devices (or one or more processors of one or more computing devices) may be programmed to execute the computer-executable instructions. A computing device or processor may be programmed to execute instructions when the instructions are stored in a manner accessible to the computing device/processor, such as in a local memory (e.g., an on-chip cache or instruction register, a computer-readable storage medium accessible via a bus, a computer-readable storage medium accessible via one or more networks and accessible by the device/processor, etc.). Functional facilities that comprise these computer-executable instructions may be integrated with and direct the operation of a single multi-purpose programmable digital computer apparatus, a coordinated system of two or more multi-purpose computer apparatuses sharing processing power and jointly carrying out the techniques described herein, a single computer apparatus or coordinated system of computer apparatuses (co-located or geographically distributed) dedicated to executing the techniques described herein, one or more Field-Programmable Gate Arrays (FPGAs) for carrying out the techniques described herein, or any other suitable system.

Figure 19:
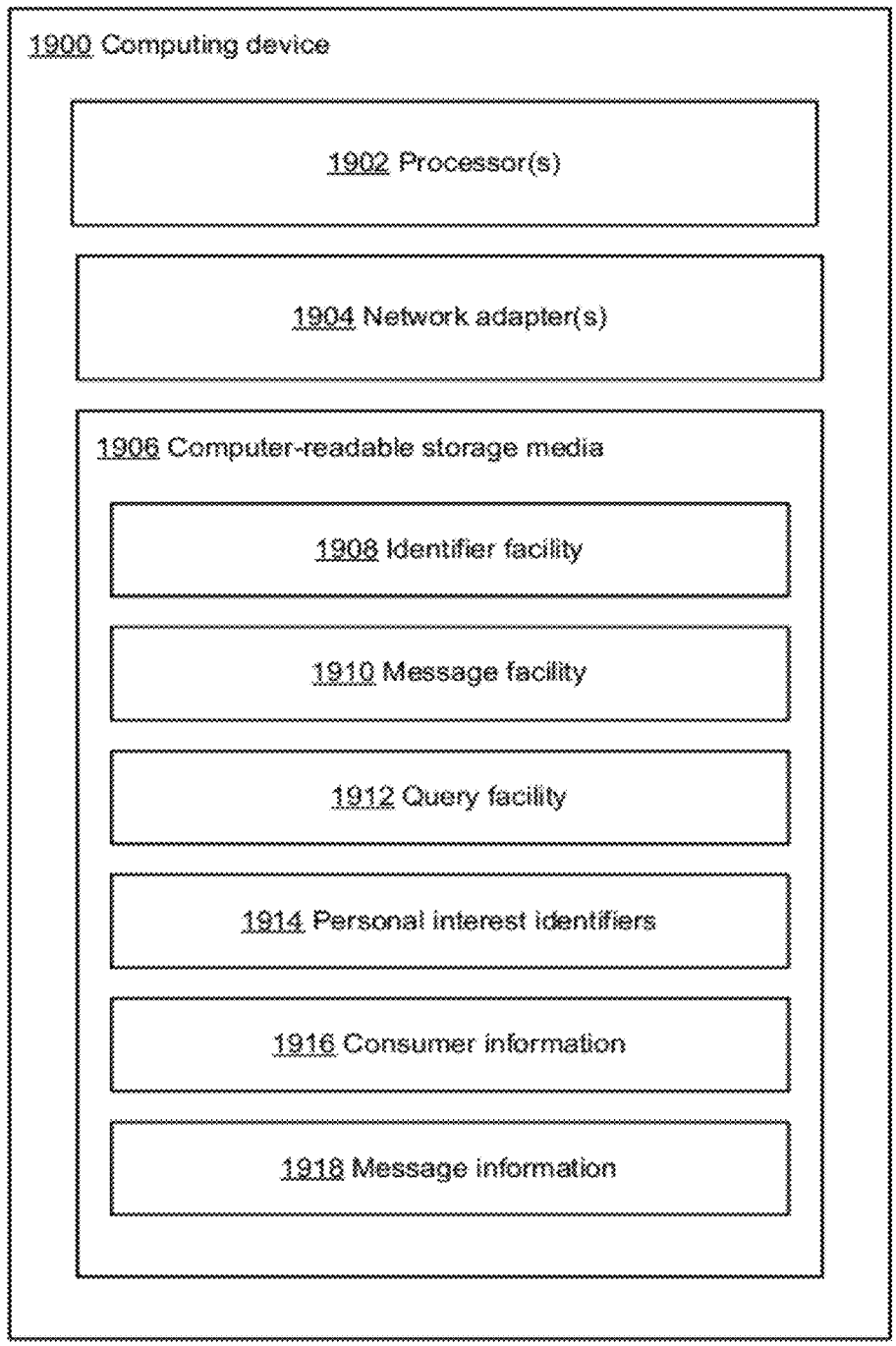
FIG. 19 is a block diagram of a computing device with which some embodiments may operate.

FIG. 19 illustrates one exemplary implementation of a computing device in the form of a computing device 1900 that may be used in a system implementing the techniques described herein, although others are possible. It should be appreciated that FIG. 19 is intended neither to be a depiction of necessary components for a computing device to operate in accordance with the principles described herein, nor a comprehensive depiction.

Computing device 1900 may comprise at least one processor 1902, a network adapter 1904, and computer-readable storage media 1906. Computing device 1900 may be, for example, a desktop or laptop personal computer, a personal digital assistant (PDA), a smart mobile phone, a server, or any other suitable computing device. Network adapter 1904 may be any suitable hardware and/or software to enable the computing device 1900 to communicate wired and/or wirelessly with any other suitable computing device over any suitable computing network. The computing network may include wireless access points, switches, routers, gateways, and/or other networking equipment as well as any suitable wired and/or wireless communication medium or media for exchanging data between two or more computers, including the Internet. Computer-readable media 1906 may be adapted to store data to be processed and/or instructions to be executed by processor 1902. Processor 1902 enables processing of data and execution of instructions. The data and instructions may be stored on the computer-readable storage media 1906 and may, for example, enable communication between components of the computing device 1900.

The data and instructions stored on computer-readable storage media 1906 may comprise computer-executable instructions implementing techniques which operate according to the principles described herein. In the example of FIG. 19, computer-readable storage media 1906 stores computer-executable instructions implementing various facilities and storing various information as described above. Computer-readable storage media 1906 may store an identifier facility 1908 for receiving and/or managing one or more personal interest identifiers to be used in distributing messages from promoters to consumers, a message facility 1910 for distributing messages from promoters to consumers, and a query facility 1912 for reviewing information stored by a message distribution system. The computer-readable storage medium 1906 may further include a data store 1914 of personal interest identifiers, a data store 1916 of information regarding consumers, and a data store 1918 of information regarding messages.

While not illustrated in FIG. 19, a computing device may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Embodiments have been described where the techniques are implemented in circuitry and/or computer-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The word "exemplary" is used herein to mean serving as an example, instance, or illustration. Any embodiment, implementation, process, feature, etc. described herein as exemplary should therefore be understood to be an illustrative example and should not be understood to be a preferred or advantageous example unless otherwise indicated.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the principles described herein. Accordingly, the foregoing description and drawings are by way of example only.

What is claimed is:

1. A method of operating a system that distributes, on behalf of one or more promoters, messages via the system to one or more consumers associated with one or more personal interest identifiers, each personal interest identifier indicating a personal interest of a consumer and indicating a request by a consumer to receive, via the system from the one or more promoters, messages relating to the personal interest, the method comprising:
    receiving, at the system, a request from a first consumer of the one or more consumers to receive, via the system from the one or more promoters, messages relating to a first personal interest of the first consumer, the request comprising a first personal interest identifier indicating the first personal interest; and
    storing, in at least one data store of the system, information associating the first personal interest identifier with the first consumer in a case that the first personal interest identifier was not previously stored in the at least one data store; and
    for a message of a promoter that is to be distributed via the system to one or more consumers:
        identifying, based on at least one characteristic of the message and a set of one or more personal interest identifiers stored in the at least one data store of the system and associated with one or more consumers, a selected set of personal interest identifiers for the message, the selected set of personal interest identifiers comprising one or more personal interest identifiers, wherein the set of one or more personal interest identifiers based on which the selected set is identified comprises the first personal interest identifier that was stored following receipt from the first consumer in the case that the first personal interest identifier was not previously stored by the at least one data store;
        identifying, based on information in the at least one data store associating the one or more consumers and the set of one or more personal interest identifiers, at least one consumer to whom to distribute the message based at least in part on the selected set of personal interest identifiers; and
        making the message available to the at least one consumer via at least one server of the system having a user interface by which consumers can receive the message.

2. The method of claim 1, wherein the storing comprises updating the at least one data store based on the personal interest identifier received from the consumer, wherein the updating comprises:
    when the personal interest identifier is not stored in the at least one data store, storing the personal interest identifier in the at least one data store;
    storing in the at least one data store information associating the personal interest identifier with the consumer.

3. The method of claim 1, further comprising:
    receiving from the consumer an indication that the consumer has an elevated interest in receiving via the system messages relating to the personal interest,
    wherein storing the information in the at least one data store comprises storing information indicating that the personal interest identifier is related to the elevated interest.

4. The method of claim 1, further comprising:
    receiving from the consumer a second request to receive messages via the system that are related to the personal interest identifier when the messages are related to a geographic region,
    wherein storing the information in the at least one data store comprises storing information associating the personal interest identifier with the consumer and the geographic region.

5. The method of claim 1, further comprising:
    receiving from the consumer a second request to receive messages via the system that are related to the personal interest identifier when the messages are related to a time interval,
    wherein storing the information in the at least one data store comprises storing information associating the personal interest identifier with the consumer and the time interval.

6. The method of claim 1, further comprising:
    prompting the consumer, via the user interface, with at least one question related to at least one personal interest,
    wherein receiving the request from the consumer comprises receiving the request and the personal interest identifier in response to the prompting.

7. The method of claim 1, further comprising:
    displaying to the consumer, via the user interface, a set of one or more previously-received personal interest identifiers stored in the at least one data store, the set comprising the personal interest identifier, wherein receiving the request from the consumer comprises receiving the request and the personal interest identifier in response to a selection by the consumer of the personal interest identifier in the user interface.

8. The method of claim 7, further comprising:
receiving, via the user interface, an input from the consumer; and
querying the at least one data store based on the input to determine whether any personal interest identifiers stored in the at least one data store match the input,
wherein, when at least one personal interest identifier stored in the data store matches the input, displaying the set of one or more previously-received personal interest identifiers comprises displaying a set comprising the at least one personal interest identifier stored in the at least one data store that matches the input.

9. The method of claim 1, wherein receiving the request from the consumer to receive via the system messages relating to the personal interest of the consumer comprises receiving at least a portion of a name of a commercial entity.

10. The method of claim 9, wherein receiving at least a portion of a name of a commercial entity comprises receiving a name of a business.

11. The method of claim 10, wherein receiving a name of a business comprises receiving a name of a promoter from which the consumer would like to receive messages via the system.

12. The method of claim 9, wherein receiving the request from the consumer to receive via the system messages relating to the personal interest of the consumer comprises receiving a word indicating a hobby of the consumer.

13. The method of claim 1, further comprising:
for a consumer of the one or more consumers, managing a consumer profile comprising information relating to the consumer, wherein the information of the consumer profile is insufficient to personally identify the consumer.

14. The method of claim 13, wherein the information of the consumer profile comprises a username for the consumer in the system and does not comprise a legal name of the consumer.

15. The method of claim 1, further comprising:
detecting an interaction between a consumer of the at least one consumer to whom the message is made available and the message; and
storing in the at least one data store information regarding the interaction.

16. The method of claim 15, wherein detecting the interaction comprises detecting a rating by the consumer of the message, and wherein the method further comprises providing feedback to a promoter of the message based at least in part on the rating by the consumer.

17. The method of claim 15, further comprising:
providing feedback to a promoter of the message based at least in part on the interaction, wherein the feedback comprises a number of consumers who viewed the message and/or a number of consumers who did not view the message.

18. The method of claim 15, wherein detecting the interaction between the consumer and the message comprises detecting an interaction from a group of interactions comprising viewing the message, deleting the message, rating the message, and adding an event to a calendar of the consumer based on the message.

19. The method of claim 1, wherein making the message available to the at least one consumer comprises displaying the message to a consumer of the at least one consumer via the user interface.

20. The method of claim 1, further comprising:
receiving, from a consumer of the at least one consumer to whom the message was made available, a request to add an event to a calendar managed by the system for the consumer, the event being based on the message; and
storing in the at least one data store information related to the event.

21. The method of claim 20, further comprising:
displaying to the consumer, via the user interface, information related to the message in a calendar.

22. The method of claim 20, wherein making the message available to the consumer of the at least one consumer comprises, when the message comprises information identifying an event occurring at a time, enabling the consumer to add the event to the calendar managed by the system for the consumer.

23. The method of claim 1, wherein making the message available to the at least one consumer comprises making the message available to the at least one consumer via a web page stored by at least one server of the system.

24. The method of claim 1, wherein making the message available to a consumer of the at least one consumer to whom the message is distributed comprises, for the consumer:
when the message relates to a personal interest identifier for which the consumer has indicated an elevated interest, displaying the message in a different manner from at least one other message distributed to the consumer.

25. The method of claim 1, wherein identifying the at least one consumer to whom to distribute the message comprises identifying at least one consumer who has requested to receive messages relating to one or more of the set of personal interest identifiers.

* * * * *